US012739936B2

(12) United States Patent
Liu et al.

(10) Patent No.: US 12,739,936 B2
(45) Date of Patent: Sep. 15, 2026

(54) MEASUREMENT ENHANCEMENT WITH WAKE UP SIGNAL

(71) Applicant: QUALCOMM Incorporated, San Diego, CA (US)

(72) Inventors: Le Liu, San Jose, CA (US); Gabi Sarkis, San Diego, CA (US); Jing Jiang, San Diego, CA (US); Huilin Xu, Temecula, CA (US)

(73) Assignee: Qualcomm Incorporated, San Diego, CA (US)

( * ) Notice: Subject to any disclaimer, the term of this patent is extended or adjusted under 35 U.S.C. 154(b) by 317 days.

(21) Appl. No.: 18/417,879

(22) Filed: Jan. 19, 2024

(65) Prior Publication Data

US 2025/0240846 A1 Jul. 24, 2025

(51) Int. Cl.
*H04W 76/28* (2018.01)
*H04W 52/02* (2009.01)

(52) U.S. Cl.
CPC ....... *H04W 76/28* (2018.02); *H04W 52/0229* (2013.01)

(58) Field of Classification Search
None
See application file for complete search history.

(56) References Cited

U.S. PATENT DOCUMENTS

| | | | | |
|---|---|---|---|---|
| 2020/0107373 A1* | 4/2020 | Roy | H04L 5/001 | |
| 2022/0225151 A1* | 7/2022 | Zhang | H04W 24/10 | |
| 2023/0143590 A1* | 5/2023 | Li | H04L 5/0094 | 370/329 |
| 2023/0247623 A1* | 8/2023 | Hao | H04W 72/02 | 370/329 |
| 2023/0412232 A1* | 12/2023 | Yang | H04W 24/10 | |

OTHER PUBLICATIONS

International Search Report and Written Opinion—PCT/US2024/061305—ISA/EPO—Mar. 10, 2025.

* cited by examiner

*Primary Examiner* — Angela Nguyen
(74) *Attorney, Agent, or Firm* — Holland & Hart LLP

(57) ABSTRACT

Methods, systems, and devices for method for wireless communication are described. A user equipment (UE) may receive a configuration for communicating with a network entity, where the configuration indicates a connected-mode discontinuous reception cycle, and where each cycle includes a discontinuous reception active time period and a discontinuous reception inactive time period. The UE may receive control information that configures a wake up signal (WUS) window for reception of a WUS based on a WUS reference signal. The UE may then receive the WUS or the WUS reference signal during the WUS window and may transmit an uplink control signal prior to or at a beginning of a subsequent discontinuous reception active time period based on reception of the WUS or of the WUS reference signal.

29 Claims, 20 Drawing Sheets

MEASUREMENT ENHANCEMENT WITH WAKE UP SIGNAL

FIELD OF TECHNOLOGY

The following relates to method for wireless communication, including measurement enhancement with wake up signal (WUS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support measurement enhancement with wake up signal (WUS). For example, the described techniques provide for efficient communications by transmitting an early channel measurement report if a WUS indicates that an upcoming discontinuous reception active time period duration is empty (e.g., does not include a data transmission). A user equipment (UE) may utilize a WUS reference signal to measure and report one or more channel parameters prior to or at a beginning of a subsequent discontinuous reception active time period. Additionally, or alternatively, the described techniques relate to a UE requesting for a modified channel state information reference signal measurement configuration for a discontinuous reception active time period, when the discontinuous reception active time period is indicated to be empty. In such cases, the network entity may modify the channel state information reference signal measurement configuration in accordance with the request from the UE.

A method for wireless communications by a UE is described. The method may include receiving a configuration for communicating with a network entity, where the configuration indicates a connected-mode discontinuous reception cycle, where each cycle includes a discontinuous reception active time period and a discontinuous reception inactive time period, receiving control information that configures a wake up signal (WUS) window for reception of a WUS, where reception of the WUS is in accordance with timing that is based on a WUS reference signal, receiving the WUS or the WUS reference signal during the WUS window, and transmitting an uplink control signal prior to or at a beginning of a subsequent discontinuous reception active time period based on reception of the WUS or of the WUS reference signal.

A UE for wireless communications is described. The UE may include one or more memories storing processor executable code, and one or more processors coupled with the one or more memories. The one or more processors may individually or collectively operable to execute the code to cause the UE to receive a configuration for communicating with a network entity, where the configuration indicates a connected-mode discontinuous reception cycle, where each cycle includes a discontinuous reception active time period and a discontinuous reception inactive time period, receive control information that configures a wake up signal (WUS) window for reception of a WUS, where reception of the WUS is in accordance with timing that is based on a WUS reference signal, receive the WUS or the WUS reference signal during the WUS window, and transmit an uplink control signal prior to or at a beginning of a subsequent discontinuous reception active time period based on reception of the WUS or of the WUS reference signal.

Another UE for wireless communications is described. The UE may include means for receiving a configuration for communicating with a network entity, where the configuration indicates a connected-mode discontinuous reception cycle, where each cycle includes a discontinuous reception active time period and a discontinuous reception inactive time period, means for receiving control information that configures a wake up signal (WUS) window for reception of a WUS, where reception of the WUS is in accordance with timing that is based on a WUS reference signal, means for receiving the WUS or the WUS reference signal during the WUS window, and means for transmitting an uplink control signal prior to or at a beginning of a subsequent discontinuous reception active time period based on reception of the WUS or of the WUS reference signal.

A non-transitory computer-readable medium storing code for wireless communications is described. The code may include instructions executable by one or more processors to receive a configuration for communicating with a network entity, where the configuration indicates a connected-mode discontinuous reception cycle, where each cycle includes a discontinuous reception active time period and a discontinuous reception inactive time period, receive control information that configures a wake up signal (WUS) window for reception of a WUS, where reception of the WUS is in accordance with timing that is based on a WUS reference signal, receive the WUS or the WUS reference signal during the WUS window, and transmit an uplink control signal prior to or at a beginning of a subsequent discontinuous reception active time period based on reception of the WUS or of the WUS reference signal.

Some examples of the method, UEs, and non-transitory computer-readable medium described herein may further include operations, features, means, or instructions for receiving a signal enabling periodic reporting of channel information, where the channel information includes a reference signal received power report or a channel state information report or both.

In some examples of the method, UEs, and non-transitory computer-readable medium described herein, receiving the WUS or the WUS reference signal may include operations, features, means, or instructions for receiving the WUS during the WUS window, the WUS indicating that the subsequent discontinuous reception active time period may be scheduled to be empty, where transmitting the uplink control signal may be based on the WUS and the signal enabling periodic reporting of the channel information.

Some examples of the method, UEs, and non-transitory computer-readable medium described herein may further include operations, features, means, or instructions for monitoring for the WUS reference signal including a demodulation reference signal for link quality measurement and measuring one or more channel parameters based on the demodulation reference signal.

Some examples of the method, UEs, and non-transitory computer-readable medium described herein may further include operations, features, means, or instructions for transmitting the uplink control signal may be based on the one or more channel parameters being greater than a threshold. Some examples of the method, UEs, and non-transitory computer-readable medium described herein may further include operations, features, means, or instructions for transmitting the uplink control signal may be based on a difference in two subsequent measurements of the one or more channel parameters satisfying a threshold.

In some examples of the method, UEs, and non-transitory computer-readable medium described herein, receiving the WUS or the WUS reference signal may include operations, features, means, or instructions for receiving the WUS during the WUS window, the WUS indicating that a data transmission may be scheduled for the subsequent discontinuous reception active time period.

In some examples of the method, UEs, and non-transitory computer-readable medium described herein, the uplink control signal may be transmitted to report the channel information based on the WUS demodulation reference signal, which may be used to select a modulation and coding scheme of the data transmission in the subsequent discontinuous reception active time period.

Some examples of the method, UEs, and non-transitory computer-readable medium described herein may further include operations, features, means, or instructions for monitoring for the WUS reference signal including a demodulation reference signal during the WUS window, where the WUS may be not received in the WUS window.

Some examples of the method, UEs, and non-transitory computer-readable medium described herein may further include operations, features, means, or instructions for measuring a link quality based on the demodulation reference signal, where transmitting the uplink control signal may be based on the link quality satisfying a threshold.

Some examples of the method, UEs, and non-transitory computer-readable medium described herein may further include operations, features, means, or instructions for receiving a radio resource control signal configuring a physical uplink control channel for transmitting the uplink control signal prior to or at the beginning of the subsequent discontinuous reception active time period.

Some examples of the method, UEs, and non-transitory computer-readable medium described herein may further include operations, features, means, or instructions for receiving a radio resource control signal configuring a physical uplink control channel for transmitting the uplink control signal during an offset period from the beginning of the WUS window, where the offset period may be great than a threshold.

Some examples of the method, UEs, and non-transitory computer-readable medium described herein may further include operations, features, means, or instructions for transmitting the uplink control signal may be based on one or more of a radio resource control signal, a medium access control layer control element, an indication in the WUS, or any combination thereof.

A method for wireless communications by a UE is described. The method may include receiving a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals, receiving control information that configures a wake up signal (WUS) window for reception of a WUS, receiving the WUS during the WUS window, and transmitting, during a subsequent discontinuous reception active time period and based on reception of the WUS, one or more channel state information reports corresponding to a subset of the quantity of channel state information reference signals.

A UE for wireless communications is described. The UE may include one or more memories storing processor executable code, and one or more processors coupled with the one or more memories. The one or more processors may individually or collectively operable to execute the code to cause the UE to receive a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals, receive control information that configures a wake up signal (WUS) window for reception of a WUS, receive the WUS during the WUS window, and transmit, during a subsequent discontinuous reception active time period and based on reception of the WUS, one or more channel state information reports corresponding to a subset of the quantity of channel state information reference signals.

Another UE for wireless communications is described. The UE may include means for receiving a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals, means for receiving control information that configures a wake up signal (WUS) window for reception of a WUS, means for receiving the WUS during the WUS window, and means for transmitting, during a subsequent discontinuous reception active time period and based on reception of the WUS, one or more channel state information reports corresponding to a subset of the quantity of channel state information reference signals.

A non-transitory computer-readable medium storing code for wireless communications is described. The code may include instructions executable by one or more processors to receive a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals, receive control information that configures a wake up signal (WUS) window for reception of a WUS, receive the WUS during the WUS window, and transmit, during a subsequent discontinuous reception active time period and based on reception of the WUS, one or more channel state information reports corresponding to a subset of the quantity of channel state information reference signals.

Some examples of the method, UEs, and non-transitory computer-readable medium described herein may further include operations, features, means, or instructions for receiving a modified channel state information measurement configuration for the discontinuous reception inactive time period based on a UE assistance information.

Some examples of the method, UEs, and non-transitory computer-readable medium described herein may further include operations, features, means, or instructions for receiving a signal enabling periodic reporting of channel information, where the channel information includes a reference signal received power report or a channel state information report or both.

In some examples of the method, UEs, and non-transitory computer-readable medium described herein, the WUS indicates that the discontinuous reception active time period may be scheduled to be empty and transmitting the one or more channel state information reports may be based on the WUS and the signal enabling periodic reporting of the channel information with the modified channel state information measurement configuration.

Some examples of the method, UEs, and non-transitory computer-readable medium described herein may further include operations, features, means, or instructions for identifying a channel state information measurement periodicity for the discontinuous reception active time period and modifying the channel state information measurement periodicity based on a scaling factor for the discontinuous reception inactive time period, where transmitting the one or more channel state information reports may be in accordance with the modified channel state information measurement periodicity.

In some examples of the method, UEs, and non-transitory computer-readable medium described herein, the one or more channel state information reports corresponds to a first channel state information reference signal included in the subsequent discontinuous reception active time period.

Some examples of the method, UEs, and non-transitory computer-readable medium described herein may further include operations, features, means, or instructions for transmitting the one or more channel state information reports may be based on one or more of a radio resource control signal, a medium access control layer control element, an indication in the WUS, or any combination thereof.

A method for wireless communications by a network entity is described. The method may include transmitting a configuration for communicating with a UE, where the configuration indicates a connected-mode discontinuous reception cycle, where each cycle includes a discontinuous reception active time period and a discontinuous reception inactive time period, transmitting control information that configures a wake up signal (WUS) window for reception of a WUS, where reception of the WUS is in accordance with timing that is based on a WUS reference signal, transmitting the WUS or the WUS reference signal during the WUS window, and receiving an uplink control signal prior to or at a beginning of a subsequent discontinuous reception active time period based on reception of the WUS or of the WUS reference signal.

A network entity for wireless communications is described. The network entity may include one or more memories storing processor executable code, and one or more processors coupled with the one or more memories. The one or more processors may individually or collectively operable to execute the code to cause the network entity to transmit a configuration for communicating with a UE, where the configuration indicates a connected-mode discontinuous reception cycle, where each cycle includes a discontinuous reception active time period and a discontinuous reception inactive time period, transmit control information that configures a wake up signal (WUS) window for reception of a WUS, where reception of the WUS is in accordance with timing that is based on a WUS reference signal, transmit the WUS or the WUS reference signal during the WUS window, and receive an uplink control signal prior to or at a beginning of a subsequent discontinuous reception active time period based on reception of the WUS or of the WUS reference signal.

Another network entity for wireless communications is described. The network entity may include means for transmitting a configuration for communicating with a UE, where the configuration indicates a connected-mode discontinuous reception cycle, where each cycle includes a discontinuous reception active time period and a discontinuous reception inactive time period, means for transmitting control information that configures a wake up signal (WUS) window for reception of a WUS, where reception of the WUS is in accordance with timing that is based on a WUS reference signal, means for transmitting the WUS or the WUS reference signal during the WUS window, and means for receiving an uplink control signal prior to or at a beginning of a subsequent discontinuous reception active time period based on reception of the WUS or of the WUS reference signal.

A non-transitory computer-readable medium storing code for wireless communications is described. The code may include instructions executable by one or more processors to transmit a configuration for communicating with a UE, where the configuration indicates a connected-mode discontinuous reception cycle, where each cycle includes a discontinuous reception active time period and a discontinuous reception inactive time period, transmit control information that configures a wake up signal (WUS) window for reception of a WUS, where reception of the WUS is in accordance with timing that is based on a WUS reference signal, transmit the WUS or the WUS reference signal during the WUS window, and receive an uplink control signal prior to or at a beginning of a subsequent discontinuous reception active time period based on reception of the WUS or of the WUS reference signal.

Some examples of the method, network entities, and non-transitory computer-readable medium described herein may further include operations, features, means, or instructions for transmitting a signal enabling periodic reporting of channel information, where the channel information includes a reference signal received power report or a channel state information report or both.

In some examples of the method, network entities, and non-transitory computer-readable medium described herein, transmitting the WUS or the WUS reference signal may include operations, features, means, or instructions for transmitting the WUS during the WUS window, the WUS indicating that the subsequent discontinuous reception active time period may be scheduled to be empty, where receiving the uplink control signal may be based on the WUS and the signal enabling periodic reporting of the channel information.

Some examples of the method, network entities, and non-transitory computer-readable medium described herein may further include operations, features, means, or instructions for identifying one or more channel parameters based on the WUS reference signal including a demodulation reference signal for link quality measurement.

Some examples of the method, network entities, and non-transitory computer-readable medium described herein may further include operations, features, means, or instructions for receiving the uplink control signal may be based on the one or more channel parameters being greater than a threshold.

Some examples of the method, network entities, and non-transitory computer-readable medium described herein may further include operations, features, means, or instructions for receiving the uplink control signal may be based on a difference in two subsequent measurements of the one or more channel parameters satisfying a threshold.

In some examples of the method, network entities, and non-transitory computer-readable medium described herein, transmitting the WUS or the WUS reference signal may include operations, features, means, or instructions for transmitting the WUS during the WUS window, the WUS indicating that a data transmission may be scheduled for the subsequent discontinuous reception active time period.

In some examples of the method, network entities, and non-transitory computer-readable medium described herein, the uplink control signal may be transmitted to report the channel information based on the WUS demodulation reference signal, which may be used to select a modulation and coding scheme of the data transmission in the subsequent discontinuous reception active time period.

Some examples of the method, network entities, and non-transitory computer-readable medium described herein may further include operations, features, means, or instructions for transmitting the WUS reference signal including a demodulation reference signal during the WUS window, where the WUS may be not transmitted in the WUS window.

Some examples of the method, network entities, and non-transitory computer-readable medium described herein may further include operations, features, means, or instructions for receiving the uplink control signal may be based on a link quality satisfying a threshold, the link quality being based on the demodulation reference signal.

Some examples of the method, network entities, and non-transitory computer-readable medium described herein may further include operations, features, means, or instructions for transmitting a radio resource control signal configuring a physical uplink control channel for transmitting the uplink control signal prior to or at the beginning of the subsequent discontinuous reception active time period.

Some examples of the method, network entities, and non-transitory computer-readable medium described herein may further include operations, features, means, or instructions for transmitting a radio resource control signal configuring a physical uplink control channel for transmitting the uplink control signal during an offset period from the beginning of the WUS window, where the offset period may be great than a threshold.

Some examples of the method, network entities, and non-transitory computer-readable medium described herein may further include operations, features, means, or instructions for receiving the uplink control signal may be based on one or more of a radio resource control signal, a medium access control layer control element, an indication in the WUS, or any combination thereof.

A method for wireless communications by a network entity is described. The method may include transmitting a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals, transmitting control information that configures a wake up signal (WUS) window for reception of a WUS, transmitting the WUS during the WUS window, and receiving, during a subsequent discontinuous reception active time period and based on reception of the WUS, one or more channel state information reports corresponding to a subset of the quantity of channel state information reference signals.

A network entity for wireless communications is described. The network entity may include one or more memories storing processor executable code, and one or more processors coupled with the one or more memories. The one or more processors may individually or collectively operable to execute the code to cause the network entity to transmit a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals, transmit control information that configures a wake up signal (WUS) window for reception of a WUS, transmit the WUS during the WUS window, and receive, during a subsequent discontinuous reception active time period and based on reception of the WUS, one or more channel state information reports corresponding to a subset of the quantity of channel state information reference signals.

Another network entity for wireless communications is described. The network entity may include means for transmitting a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals, means for transmitting control information that configures a wake up signal (WUS) window for reception of a WUS, means for transmitting the WUS during the WUS window, and means for receiving, during a subsequent discontinuous reception active time period and based on reception of the WUS, one or more channel state information reports corresponding to a subset of the quantity of channel state information reference signals.

A non-transitory computer-readable medium storing code for wireless communications is described. The code may include instructions executable by one or more processors to transmit a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals, transmit control information that configures a wake up signal (WUS) window for reception of a WUS, transmit the WUS during the WUS window, and receive, during a subsequent discontinuous reception active time period and based on reception of the WUS, one or more channel state information reports corresponding to a subset of the quantity of channel state information reference signals.

Some examples of the method, network entities, and non-transitory computer-readable medium described herein may further include operations, features, means, or instructions for transmitting a modified channel state information measurement configuration for the discontinuous reception inactive time period based on a UE assistance information.

Some examples of the method, network entities, and non-transitory computer-readable medium described herein may further include operations, features, means, or instructions for transmitting a signal enabling periodic reporting of channel information, where the channel information includes a reference signal received power report or a channel state information report or both.

In some examples of the method, network entities, and non-transitory computer-readable medium described herein, the WUS indicates that the discontinuous reception active time period may be scheduled to be empty and receiving the one or more channel state information reports may be based on the WUS and the signal enabling periodic reporting of the channel information with the modified channel state information measurement configuration.

Some examples of the method, network entities, and non-transitory computer-readable medium described herein may further include operations, features, means, or instructions for identifying a channel state information measurement periodicity for the discontinuous reception active time period and modifying the channel state information measurement periodicity based on a scaling factor for the discontinuous reception inactive time period, where receiving the one or more channel state information reports may be in accordance with the modified channel state information measurement periodicity.

In some examples of the method, network entities, and non-transitory computer-readable medium described herein, the one or more channel state information reports corresponds to a first channel state information reference signal included in the subsequent discontinuous reception active time period.

Some examples of the method, network entities, and non-transitory computer-readable medium described herein may further include operations, features, means, or instructions for receiving the one or more channel state information reports may be based on one or more of a radio resource control signal, a medium access control layer control element, an indication in the WUS, or any combination thereof.

DETAILED DESCRIPTION

Figure 1:
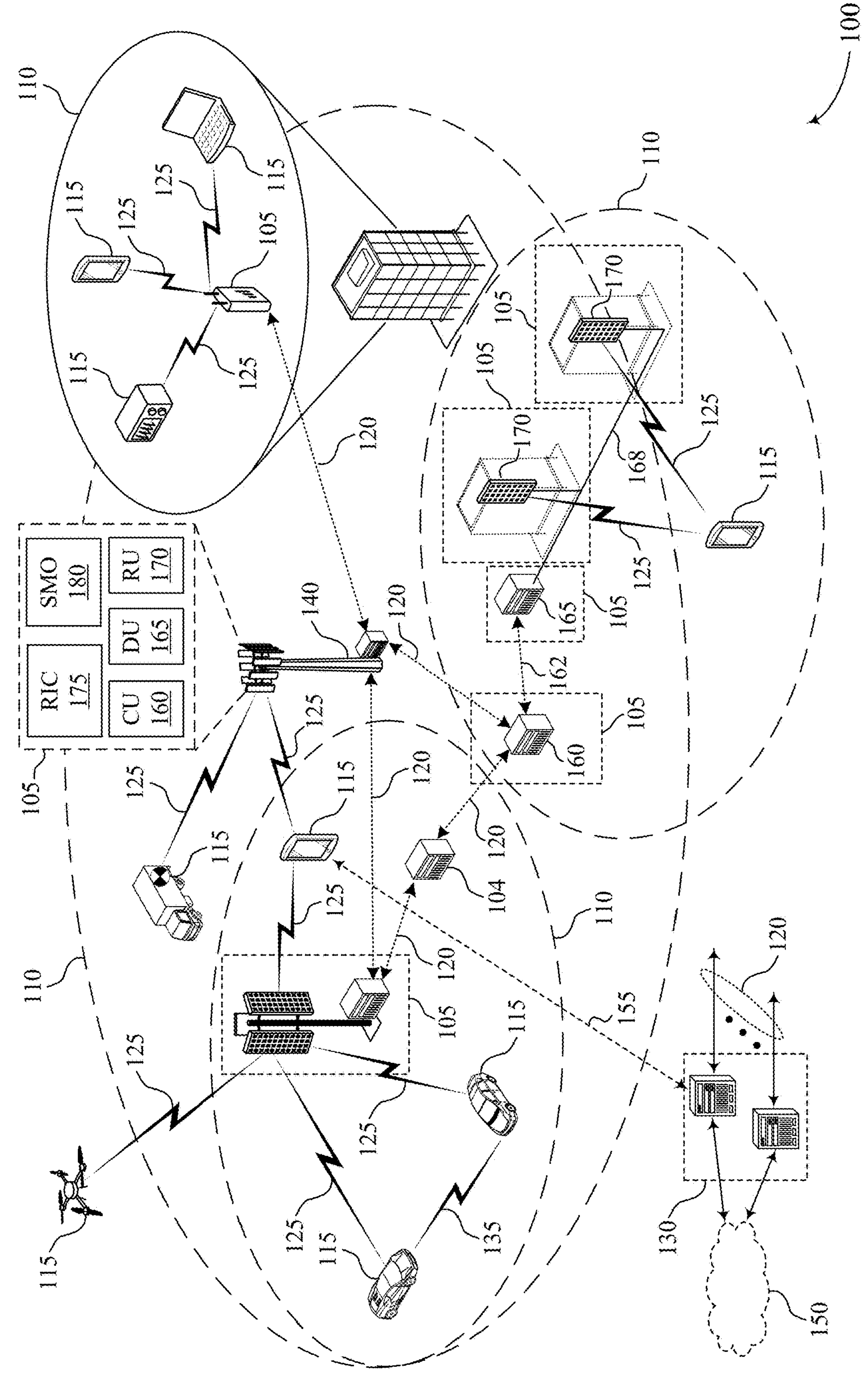
FIG. 1 shows an example of a wireless communications system that supports measurement enhancement with wake up signal (WUS) in accordance with one or more aspects of the present disclosure.

In wireless communications systems, a network entity may define cycles of activity and inactivity of transmissions and receptions. To save power, the network entity may configure periods of activity and inactivity with the discontinuous reception mode. While communicating in a connected mode, a user equipment (UE) may receive a configuration indicating a connected-mode discontinuous reception cycle, where each cycle includes a discontinuous reception active time period and a discontinuous reception inactive time period. In some examples, during the discontinuous reception active time period, the network entity may transmit data as well as one or more reference signals for the UE to use in measuring a channel condition. To indicate an upcoming discontinuous reception active time period, the network entity may transmit a wake up signal (WUS). In some cases, the WUS may indicate that an upcoming discontinuous reception active time period is empty (i.e., does not include a data transmission). However, because the discontinuous reception active time period includes one or more reference signals, the UE may remain awake to perform the channel measurements and may not be able to enter into a power saving mode.

One or more aspects of the present disclosure provides for techniques for the UE to transmit an early channel measurement report if a WUS indicates that an upcoming discontinuous reception active time period duration is empty. For instance, the UE may monitor for the WUS during a WUS time window. If the UE detects the WUS and the WUS indicates that the subsequent discontinuous reception active time period is empty (e.g., WUS=0), then the UE may use a WUS reference signal to perform one or more channel measurements (instead of using the channel state information reference signal included in the discontinuous reception active time period). In such cases, the network entity may configure a physical uplink control channel (for transmission of the channel measurement report) prior to or at a beginning of the subsequent discontinuous reception active time period. The network entity may configure the physical uplink control channel during a time offset after reception of the WUS, if the time offset is greater than a threshold. Alternatively, the network entity may configure the physical uplink control channel at the beginning of the subsequent discontinuous reception active time period.

Additionally, or alternatively, if a WUS indicates that an upcoming discontinuous reception active time period is empty, then the UE may reduce the frequency of channel measurements. The UE may indicate a preferred relaxed channel state information reference signal measurement during empty discontinuous reception active time period, as UE assistance information. Based on the UE assistance information, the network entity can configure a relaxed channel state information reference signal measurement configuration for discontinuous reception active time period (when WUS=0).

Aspects of the disclosure are initially described in the context of wireless communications systems. Aspects of the disclosure are further illustrated by and described with reference to communication timelines. Aspects of the disclosure are further illustrated by and described with reference to apparatus diagrams, system diagrams, and flowcharts that relate to measurement enhancement with WUS.

FIG. 1 shows an example of a wireless communications system 100 that supports measurement enhancement with WUS in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support measurement enhancement with WUS as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a UE 115 may receive a configuration for communicating with a network entity. The configuration may indicate a connected-mode discontinuous reception cycle, where each cycle includes a discontinuous reception active time period and a discontinuous reception inactive time period. The UE 115 may receive control information that configures a WUS window for reception of a WUS. In some cases, reception of the WUS is in accordance with timing that is based on a WUS reference signal. The UE 115 may further receive the WUS or the WUS reference signal during the WUS window and may transmit an uplink control signal prior to or at a beginning of a subsequent discontinuous reception active time period based on reception of the WUS or of the WUS reference signal.

Additionally, or alternatively, the UE 115 may receive a configuration for communicating with a network entity 105, where the configuration indicates a connected-mode discontinuous reception cycle. In some examples, each cycle includes a discontinuous reception active time period and a discontinuous reception inactive time period, where the discontinuous reception active time period and the discontinuous reception inactive time period each includes a quantity of channel state information reference signals. The UE 115 may receive control information that configures a WUS window for reception of a WUS and may further receive the WUS during the WUS window. The UE 115 may then transmit, during a subsequent discontinuous reception active time period and based on reception of the WUS, one or more channel state information reports corresponding to a subset of the quantity of channel state information reference signals.

Figure 2:
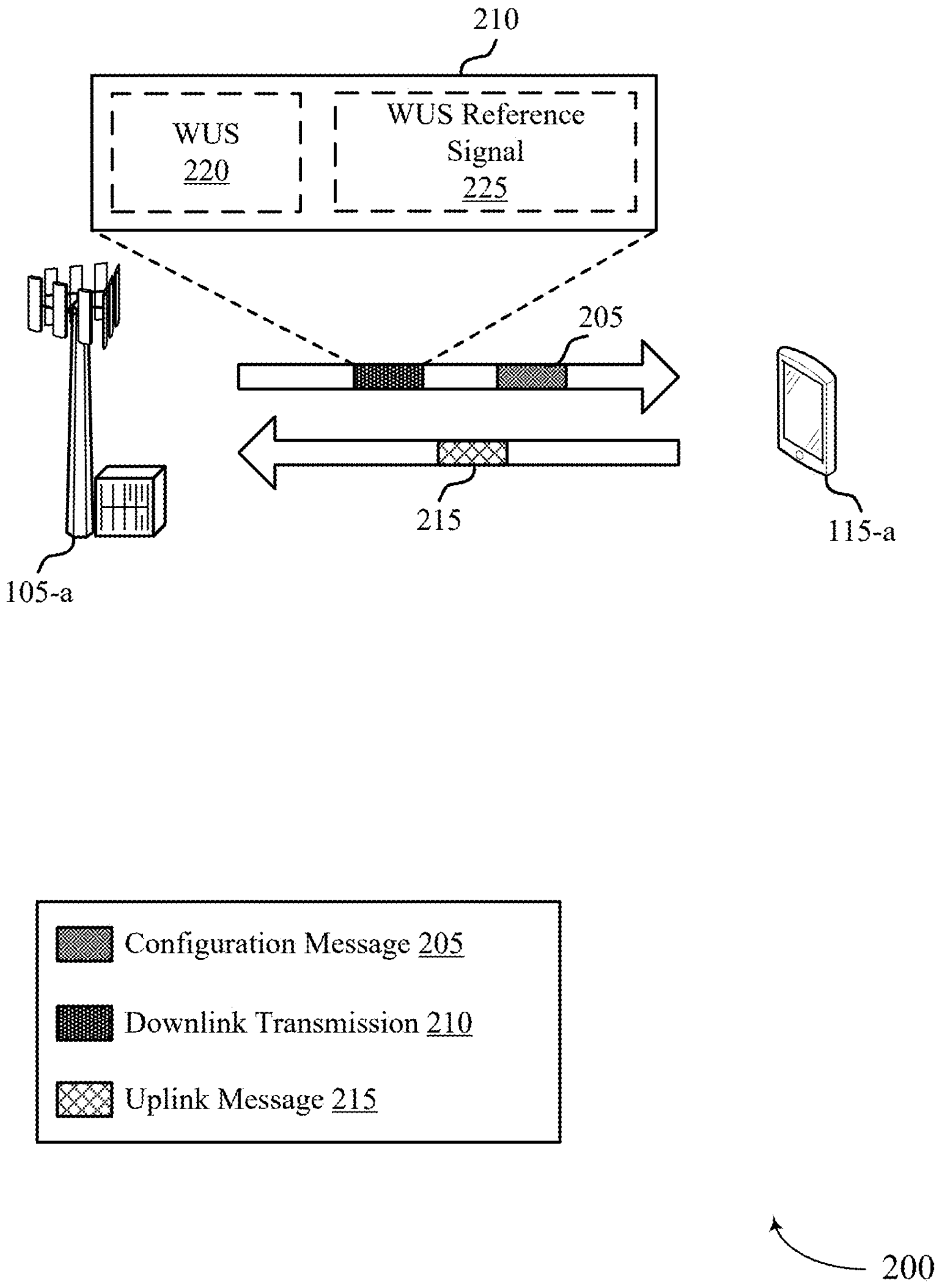
FIG. 2 shows an example of a wireless communications system that supports measurement enhancement with WUS in accordance with one or more aspects of the present disclosure.

FIG. 2 shows an example of a wireless communications system 200 that supports measurement enhancement with WUS in accordance with one or more aspects of the present disclosure. The wireless communications system 200 illustrates communications between a UE 115-*a* and a network entity 105-*a*, which may be examples of corresponding devices as described herein with reference to FIG. 1.

In some systems, the network entity 105-*a* may perform a downlink transmission including a configuration message 205 that may include information for the UE 115-*a* to establish communications with the network entity 105-*a*. For example, the configuration message 205 may include a configuration for communicating with the network entity 105-*a*. In some examples, the configuration may indicate a connected-mode discontinuous reception cycle, where each cycle includes a discontinuous reception active time period and a discontinuous reception inactive time period. In some examples, the network entity 105-*a* may configure the UE 115-*a* to perform a channel measurement (e.g., radio resource management measurement, channel state information measurement and reporting) during the active during for a connected UE 115-*a*. That is, when the UE 115-*a* is in a connected mode, the UE 115-*a* may periodically perform channel state parameter measurements during the discontinuous reception active time period.

In some wireless communications systems, the network entity 105-*a* may transmit a WUS during a connected-mode discontinuous reception cycle for power saving. The network entity 105-*a* may indicate the WUS using DCI format 2_6 associated with a power saving radio network temporary identifier (PS-RNTI). However, even if the network entity 105-*a* configures a WUS, it may not save power for empty discontinuous reception cycle (no data is transmitted in during a discontinuous reception active time period), due to the requirement of radio resource management measurement and/or channel state information measurement and reporting.

One or more aspects of the present disclosure provide for early transmission of the channel state information measurement report if a discontinuous reception active time period does not include any data. For example, the network entity 105 after configuring the UE 115 with the connected-mode discontinuous reception cycle, may transmit control information that configures a WUS window for reception of a WUS, the reception of the WUS is in accordance with timing that is based on a WUS reference signal. As depicted in the example of FIG. 2, the UE 115-*a* may receive a downlink transmission 210 including the WUS 220 or the WUS reference signal 225 during the WUS window. The UE 115-*a* may use the WUS reference signal 225 (e.g., WUS physical downlink control channel demodulation reference signal) for measuring channel parameters of the serving cell, and may skip the channel state information reference signal based measurement during the empty discontinuous reception active time period for power saving. Additionally, or alternatively, the UE 115-*a* may use the WUS reference signal 225 (e.g., WUS physical downlink control channel demodulation reference signal) for measuring channel parameters (e.g., reference signal received power or signal to noise ratio or both) of the serving cell, and may perform an early indication of link quality before a non-empty discontinuous reception active time period. For instance, the UE 115-*a* may transmit an uplink control signal (using uplink transmission 215) prior to or at a beginning of a subsequent discontinuous reception active time period based on reception of the WUS 220 or of the WUS reference signal 225.

For WUS reference signal-based measurement, the network entity 105-*a* may indicate whether the UE 115-*a* is to perform channel state information measurement/reporting based on the WUS reference signal in every WUS occasion via unicast radio resource control configuration. Alternatively, the network entity 105-*a* can dynamically indicate whether the UE 115-*a* is to perform the channel state information measurement/reporting based on the WUS reference signal in an upcoming WUS occasion. The UE 115-*a* may transmit the uplink control signal (via the uplink transmission 215) based on one or more of a radio resource control signal, a medium access control layer control element, an indication in the WUS, or any combination thereof. In some examples, the network entity 105-*a* may update the radio resource control signaling transmitted in a previous discontinuous reception active time period. Additionally, or alternatively, the network entity 105-*a* may dynamically activate or deactivate (using a medium access control layer control element) in a unicast physical downlink shared channel transmitted in previous CDRX discontinuous reception active time period. In some examples, the network entity 105-*a* may communicate using an additional field in the physical downlink control channel based WUS.

In some examples, the UE 115-*a* may reduce the channel state information reference signal based measurement and reporting periodicity during an empty discontinuous reception active time period, for power saving. In some cases, the UE 115-*a* may receive the WUS 220 during the WUS window. Based on the WUS, the UE 115-*a* may determine that the subsequent discontinuous reception active time period is empty. The UE 115-*a* may transmit, during a subsequent discontinuous reception active time period and based on reception of the WUS 220, one or more channel state information reports corresponding to a subset of the quantity of channel state information reference signals. In some examples, the UE 115-*a* may receive a modified channel state information measurement configuration for the discontinuous reception inactive time period based on a UE assistance information (e.g., based on UE request via UE assistance information).

In some examples, such relaxed channel state information measurement may be subject to UE capability. The network entity 105-*a* may enable or disable this feature semi-statically by radio resource control signaling or dynamically enable or disable it via medium access control layer control element or downlink control indication (e.g., in a new field of WUS).

Figure 3:
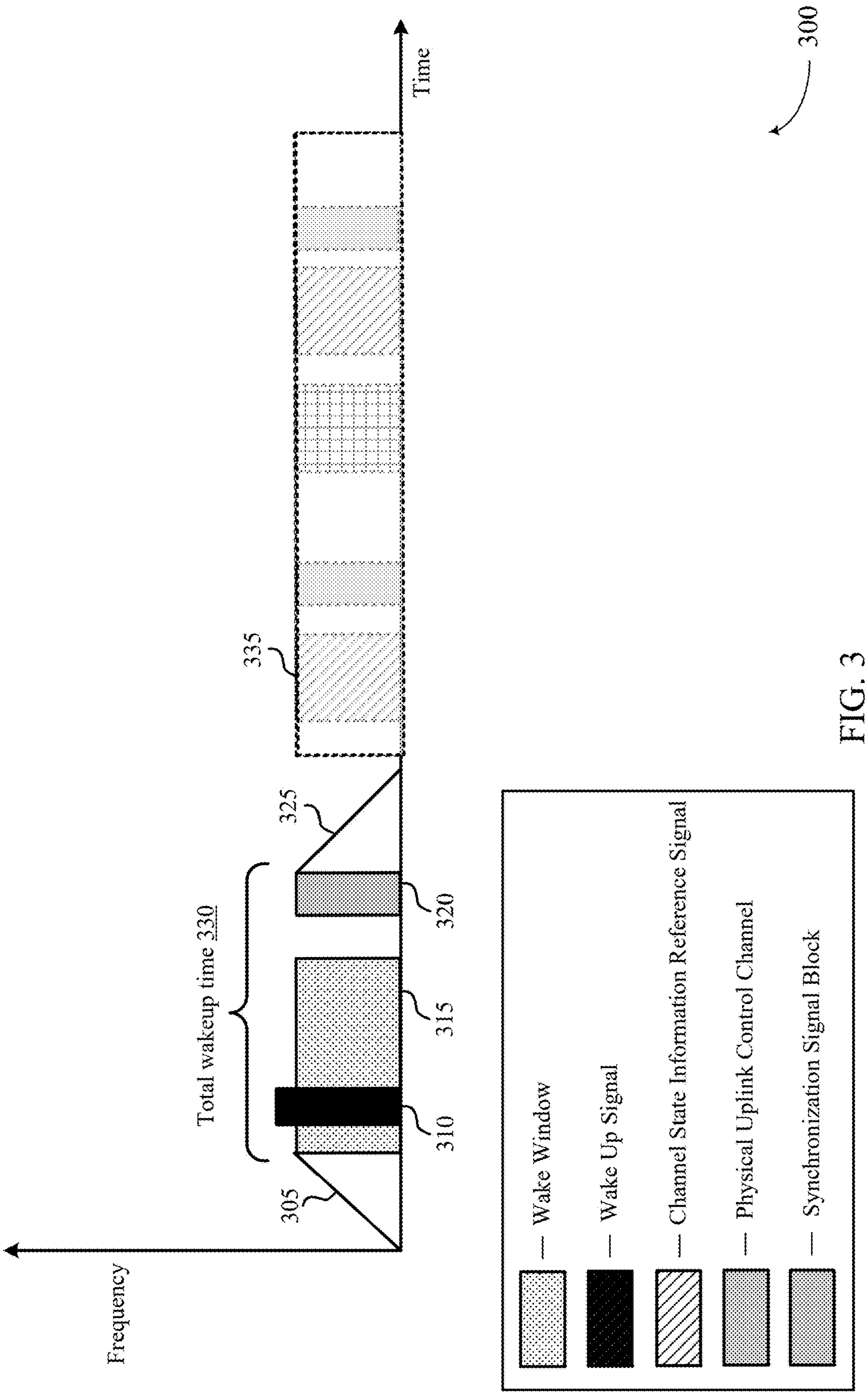
FIG. 3 shows an example of a communication timeline that supports measurement enhancement with WUS in accordance with one or more aspects of the present disclosure.

FIG. 3 shows an example of a communication timeline 300 that supports measurement enhancement with WUS in accordance with one or more aspects of the present disclosure. The communication timeline 300 illustrate performing WUS reference signal based channel measurement, as described with reference to FIGS. 1 and 2. In some examples, the UE 115 may receive a configuration for communicating with a network entity 105, the configuration indicating a connected-mode discontinuous reception cycle, where each cycle includes a discontinuous reception active time period and a discontinuous reception inactive time period. The configuration indicates a discontinuous reception active time period 335. Additionally, the UE 115 may receive control information that configures a WUS window 315 for reception of a WUS 310, where reception of the WUS is in accordance with timing that is based on a WUS reference signal (not shown).

As depicted in the example of FIG. 3, the UE 115 may wake up 305 prior to the WUS window 315 and may receive the WUS 310 during the WUS window 315. If WUS is detected and WUS indicates 0 for the UE 115, then the UE 115 may determine that the upcoming discontinuous reception active time period is empty (does not contain any data). In such cases, the UE 115 may monitor for a WUS reference signal (e.g., physical downlink control channel demodulation reference signal) for link quality measurement. Additionally, the UE 115 may transmit an uplink control signal via physical uplink control channel 320 prior to or at a beginning of a subsequent discontinuous reception active time period 335 based on reception of the WUS or of the WUS reference signal. The network entity 105 may configure the physical uplink control channel 320 via a radio resource control signaling during a time period (e.g., PS-Offset, if PS-Offset>X) or at beginning of discontinuous reception active time period 335.

The UE 115 may additionally receive a signal enabling periodic reporting of channel information, where the channel information may include a reference signal received power report or a channel state information report or both. As depicted herein, the UE 115 may receive the WUS 310 during the WUS window 315, the WUS 310 indicating that the subsequent discontinuous reception active time period 335 is scheduled to be empty. In such cases, the UE 115 may monitor for the WUS reference signal including a demodulation reference signal for link quality measurement, and may measure one or more channel parameters based on the demodulation reference signal. In some examples, the UE 115 may be triggered to send the uplink control signal via the physical uplink control channel 320 when the one or more channel parameters is greater than a threshold (e.g., layer 1 reference signal received power or signal to noise ratio based on the WUS reference signal is higher than a network entity configured absolute threshold). In some examples, the UE 115 may be triggered to send the uplink control signal via the physical uplink control channel 320 when a difference in two subsequent measurements of the one or more channel parameters satisfies a threshold (e.g., when layer 1 reference signal received power or signal to noise ratio based on the WUS reference signal does not change above a relative threshold than the measurement results in previous discontinuous reception active time period).

If the UE 115 determines that the value of WUS is 0 (indicating that the discontinuous reception active time period 335 is empty), then the UE 115 may transmit the uplink control signal via the physical uplink control channel 320 indicating that link quality is good enough and the UE 115 does not intend to perform a channel state information reporting during the discontinuous reception active time period 335. The UE 115 may go to a sleep mode 325 after transmitting the uplink control signal via the physical uplink control channel 320. Thus, in this case, a reduction in total awake time 330 may result in power savings for the UE 115.

Figure 4:
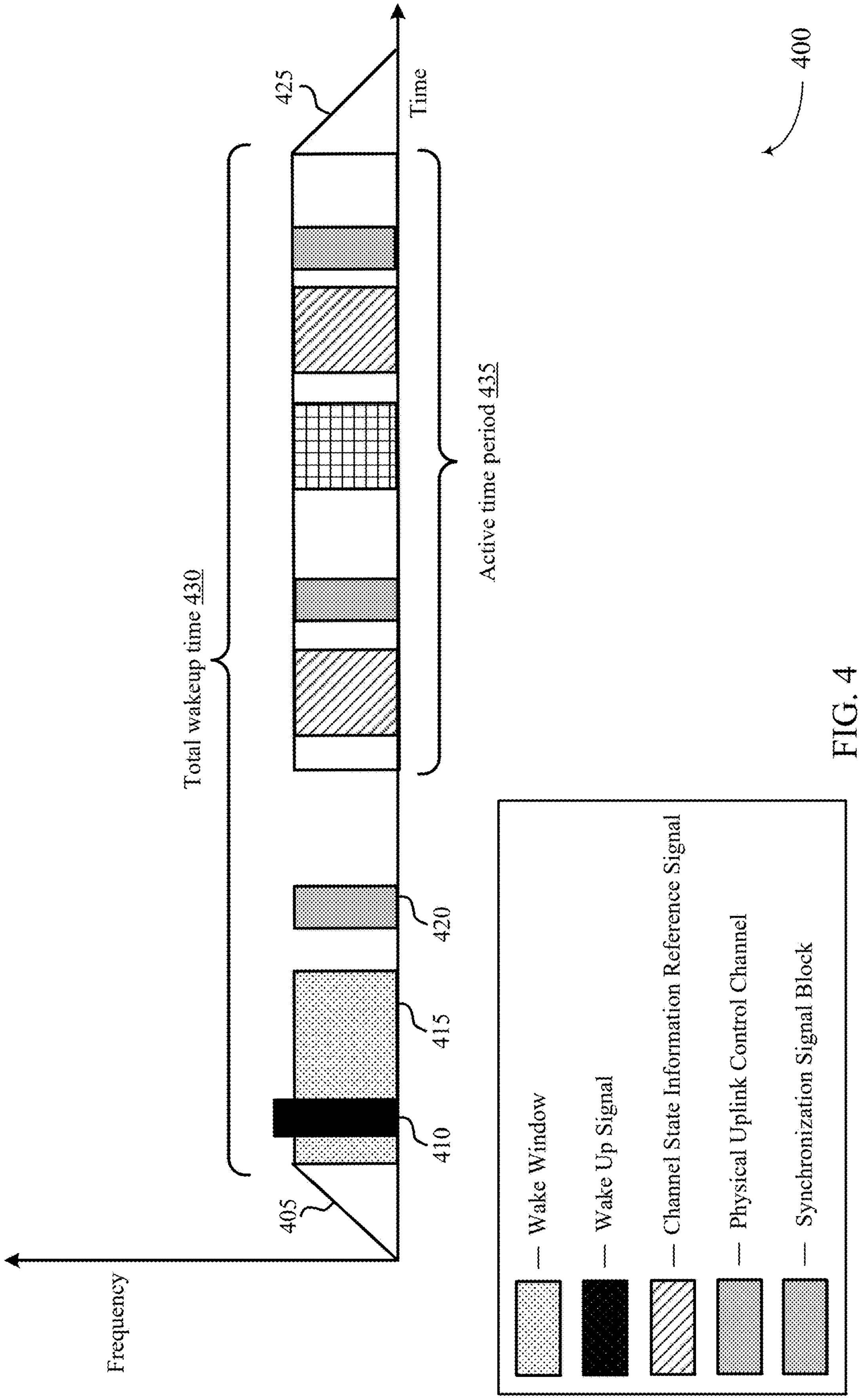
FIG. 4 shows an example of a communication timeline that supports measurement enhancement with WUS in accordance with one or more aspects of the present disclosure.

FIG. 4 shows an example of a communication timeline 400 that supports measurement enhancement with WUS in accordance with one or more aspects of the present disclosure. The communication timeline 400 illustrate performing WUS reference signal based channel measurement, as described with reference to FIGS. 1 and 2. In some examples, the UE 115 may receive a configuration for communicating with a network entity 105, the configuration indicating a connected-mode discontinuous reception cycle, where each cycle includes a discontinuous reception active time period and a discontinuous reception inactive time period. The configuration indicates a discontinuous reception active time period 435. Additionally, the UE 115 may receive control information that configures a WUS window 415 for reception of a WUS 410, where reception of the WUS is in accordance with timing that is based on a WUS reference signal (not shown).

As depicted in the example of FIG. 4, the UE 115 may wake up 405 prior to the WUS window 415 and may receive the WUS 410 during the WUS window 415. If WUS is detected and WUS indicates 1 for the UE 115, then the UE 115 may determine that the upcoming discontinuous reception active time period is non-empty (contains data transmission). In such cases, the UE 115 may monitor for a WUS reference signal (e.g., physical downlink control channel demodulation reference signal) for link quality measurement. Additionally, the UE 115 may transmit an uplink control signal via physical uplink control channel 420 prior to or at a beginning of a subsequent discontinuous reception active time period 435 based on reception of the WUS or of the WUS reference signal. The network entity 105 may configure the physical uplink control channel 420 via a radio resource control signaling during a time period (e.g., PS-Offset, if PS-Offset>X) or at beginning of discontinuous reception active time period 435.

As depicted herein, the UE 115 may receive the WUS 410 during the WUS window 415, the WUS 410 indicating that data transmission is scheduled for the subsequent discontinuous reception active time period 435. In such cases, the UE 115 may monitor for the WUS reference signal including a demodulation reference signal for link quality measurement, and may measure one or more channel parameters based on the demodulation reference signal. In some examples, the UE 115 may be triggered to send the uplink control signal via the physical uplink control channel 420 when the one or more channel parameters is greater than a threshold (e.g., layer 1 reference signal received power or signal to noise ratio based on the WUS reference signal is higher than a network entity configured absolute threshold). In some examples, the UE 115 may be triggered to send the uplink control signal via the physical uplink control channel 420 when a difference in two subsequent measurements of the one or more channel parameters satisfies a threshold (e.g., when layer 1 reference signal received power or signal to noise ratio based on the WUS reference signal does not change above a relative threshold than the measurement results in previous discontinuous reception active time period).

If the UE 115 determines that the value of WUS is 1 (indicating that the discontinuous reception active time period 435 is non-empty), then the UE 115 may transmit the uplink control signal via the physical uplink control channel 320 for early channel state information reporting. The UE 115 may transmit the uplink control signal to report the channel information based on a WUS demodulation reference signal, which is used to select a modulation and coding scheme of the data transmission in the subsequent discontinuous reception active time period 435. The UE 115 may go to a sleep mode 425 after the discontinuous reception active time period 435. In such cases, the UE 115 and the network entity 105 may experience improved data throughput with early channel state information reporting. Additionally, or alternatively, the UE 115 may save power if data transmission finishes earlier (micro-sleep in discontinuous reception active time period). Thus, in this case, a total awake time 430 may result in enhanced performance for the UE 115.

Figure 5:
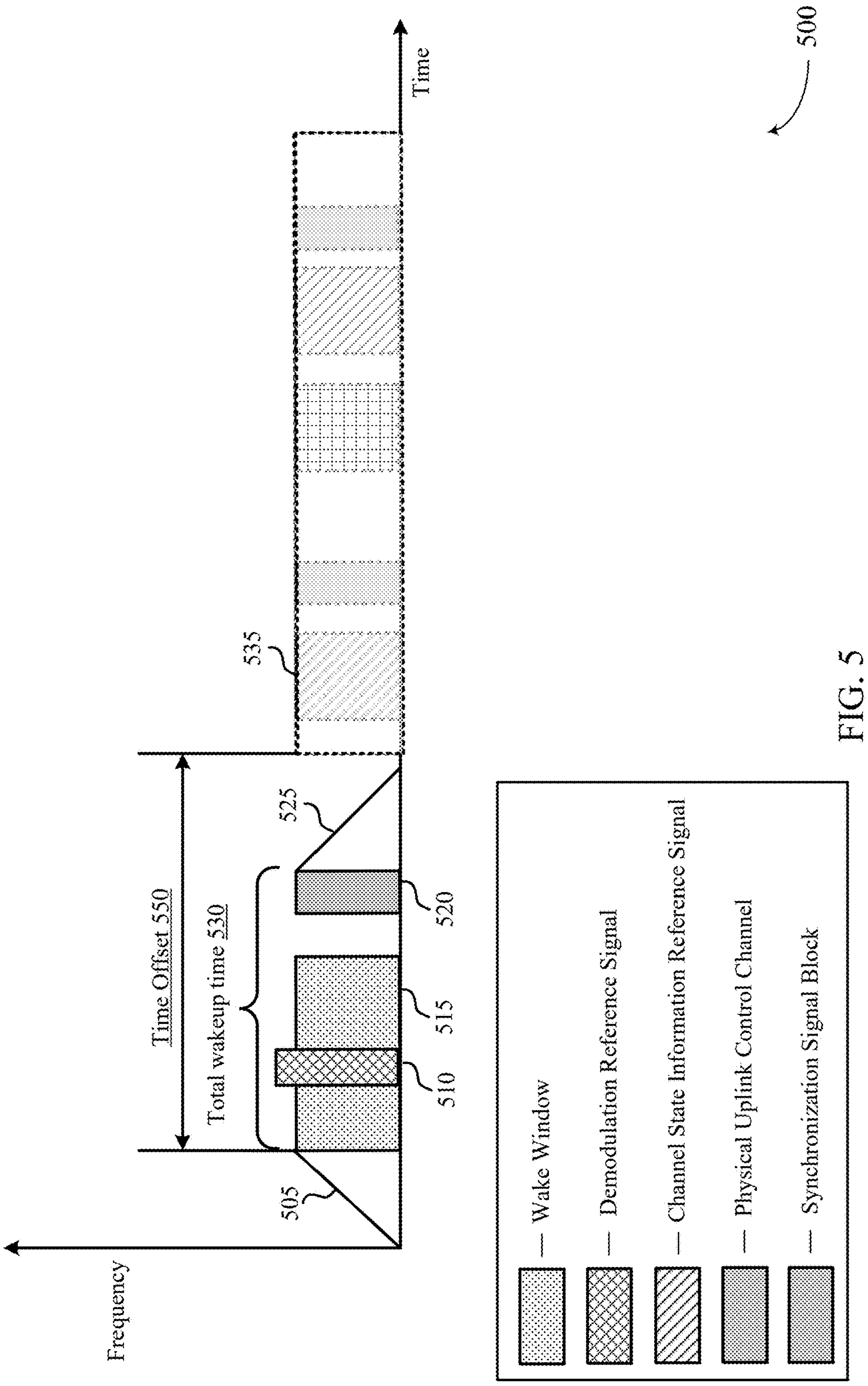
FIG. 5 shows an example of a communication timeline that supports measurement enhancement with WUS in accordance with one or more aspects of the present disclosure.

FIG. 5 shows an example of a communication timeline 500 that supports measurement enhancement with WUS in accordance with one or more aspects of the present disclosure. The communication timeline 500 illustrate performing WUS reference signal based channel measurement, as described with reference to FIGS. 1 and 2. In some examples, the UE 115 may receive a configuration for communicating with a network entity 105, the configuration indicating a connected-mode discontinuous reception cycle, where each cycle includes a discontinuous reception active time period and a discontinuous reception inactive time period. The configuration indicates a discontinuous reception active time period 535. Additionally, the UE 115 may receive control information that configures a WUS window 515 for reception of a WUS, where reception of the WUS is in accordance with timing that is based on a WUS reference signal (demodulation reference signal 510).

As depicted in the example of FIG. 5, the UE 115 may wake up 505 prior to the WUS window 515 and may determine that no WUS is detected. The UE 115 may then determine that WUS reference signal is detected. That is, even if the WUS window 515 does not include a physical downlink control channel WUS, the network entity 105 may transmit a WUS reference signal in the WUS window 515, which the UE 115 may monitor for link quality measurement. The UE 115 may transmit an uplink control signal via physical uplink control channel 520 prior to or at a beginning of a subsequent discontinuous reception active time period 535 based on reception of the WUS reference signal (demodulation reference signal 510). The network entity 105 may configure the physical uplink control channel 520 via a radio resource control signaling during a time offset 550) (e.g., PS-Offset, if PS-Offset>X) or at beginning of discontinuous reception active time period 535.

In some examples, the UE 115 may receive the UE 115 may be triggered to send the uplink control signal via the physical uplink control channel 520 when one or more channel parameters is greater than a threshold (e.g., layer 1 reference signal received power or signal to noise ratio based on the WUS reference signal is higher than a network entity configured absolute threshold). In some examples, the UE 115 may be triggered to send the uplink control signal via the physical uplink control channel 520 when a difference in two subsequent measurements of the one or more channel parameters satisfies a threshold (e.g., when layer 1 reference signal received power or signal to noise ratio based on the WUS reference signal does not change above a relative threshold than the measurement results in previous discontinuous reception active time period).

The UE 115 may transmit the uplink control signal via the physical uplink control channel 520 indicating that link quality is good enough and the UE 115 does not intend to perform a channel state information reporting or intend to perform reduced channel state information reporting during the discontinuous reception active time period 5335. The UE 115 may go to a sleep mode 525 after transmitting the uplink control signal via the physical uplink control channel 520. Thus, in this case, a reduction in total awake time 530 may result in power savings for the UE 115.

In an alternative scenario, if the UE 115 does not detect a WUS or a WUS reference signal, then the UE 115 may refrain from early reporting of channel state information. For example, if the UE 115 is configured with ps_Wakeup, and if ps_Wakeup is enabled, then the UE 115 may still perform the channel measurements during the on-Duration starts and CSI-RS-based measurement is carried out during the discontinuous reception active time period, which is a fallback operation to that of no measurement reduction.

Figure 6:
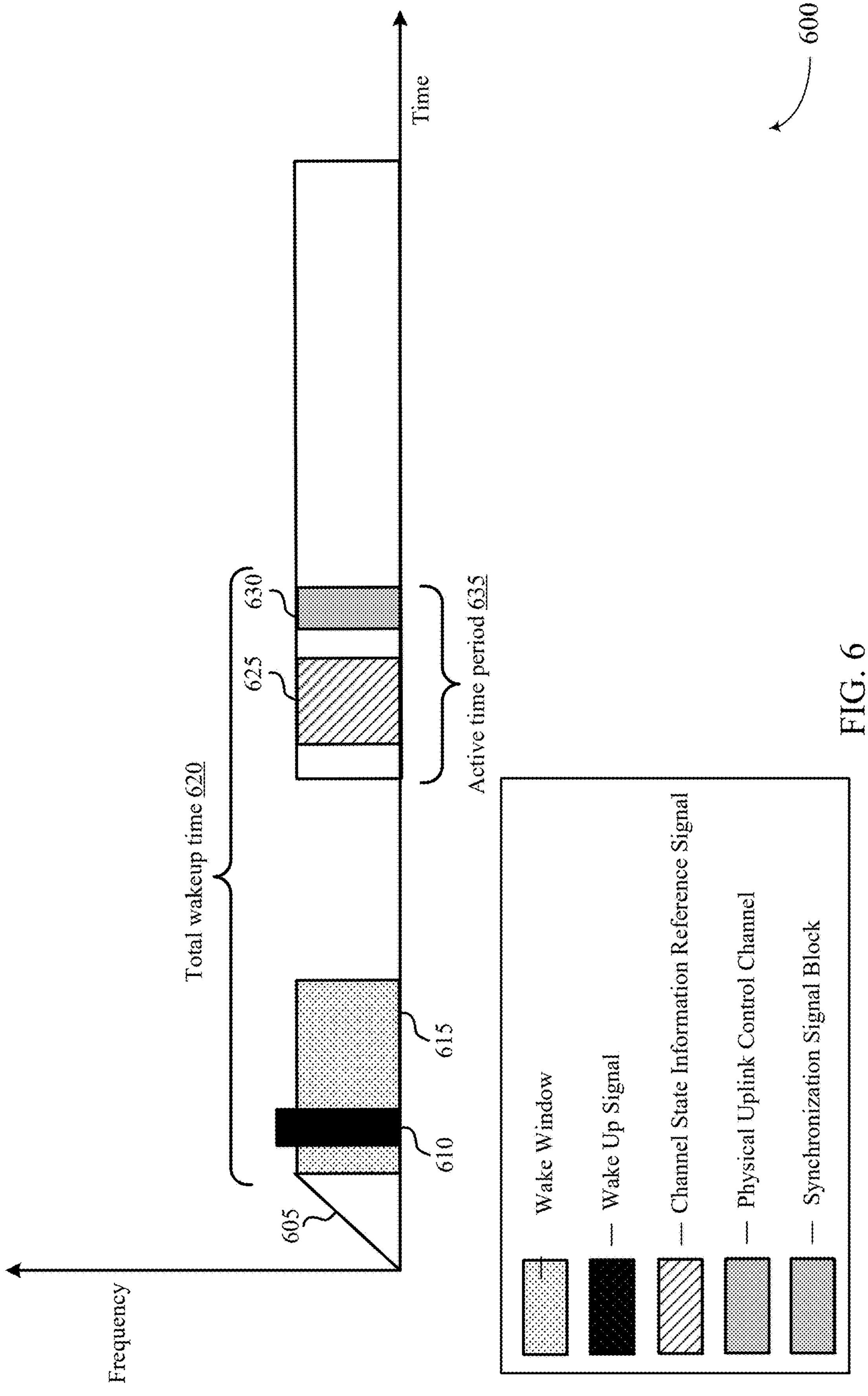
FIG. 6 shows an example of a communication timeline that supports measurement enhancement with WUS in accordance with one or more aspects of the present disclosure.

FIG. 6 shows an example of a communication timeline 600 that supports measurement enhancement with WUS in accordance with one or more aspects of the present disclosure. The communication timeline 600 illustrate performing channel measurement according to a modified periodicity, as described with reference to FIGS. 1 and 2. In some examples, the UE 115 may receive a configuration for communicating with a network entity 105, the configuration indicating a connected-mode discontinuous reception cycle, where each cycle includes a discontinuous reception active time period and a discontinuous reception inactive time period. In some cases, the discontinuous reception active time period and the discontinuous reception inactive time period may each include a quantity of channel state information reference signals. Additionally, the UE 115 may receive control information that configures a WUS window 615 for reception of a WUS 610.

As depicted in the example of FIG. 6, the UE 115 may wake up 605 prior to the WUS window 615 and may receive the WUS 610 during the WUS window 615. If WUS is detected and WUS indicates 0 for the UE 115, then the UE 115 may determine that the upcoming discontinuous reception active time period is empty (does not contain any data). A channel measurement within empty discontinuous reception time period may cost a lot of power. In such cases, the UE 115 may indicate the preferred relaxed channel state information reference signal measurement during empty discontinuous reception active time period as UE assistance information. For example, a low-mobility UE may prefer relaxed channel state information reference signal measurement during empty discontinuous reception active time period (e.g., when WUS=0) to save power.

Based on the UE assistance information, the network entity 105 may configure relaxed channel state information reference signal measurement configuration for empty discontinuous reception active time period (e.g., WUS=0), relative to that of discontinuous reception active time period (e.g., WUS=1 or no WUS but ps_Wakeup is configured). In such cases, the UE 115 may receive the WUS 610 during the WUS window 615. The UE 115 may then transmit, during a subsequent discontinuous reception active time period 635 and based on reception of the WUS 610, one or more channel state information reports corresponding to a subset of the quantity of channel state information reference signals. As depicted in the example of FIG. 6, the subset of the quantity of channel state information reference signals includes channel state information reference signal 625. The UE 115 may transmit the channel state information report via physical uplink control channel 630.

For a discontinuous reception active time period, the network entity 105 may configure a channel state information reference signal measurement periodicity as X. For a discontinuous reception non-active time period, the network entity 105 may configure a channel state information reference signal measurement periodicity as X*P, where β is a scaling factor with candidates {2, 4, 8, . . . } to increase the periodicity. For example, the UE 115 may identify a channel state information measurement periodicity for the discontinuous reception active time period, and may modify the channel state information measurement periodicity based on a scaling factor for the discontinuous reception inactive time period. Alternatively, the channel state information reference signal periodicity is set implicitly similar as that of the SSB for RRM measurement (e.g., 40 ms) to reduce the CSI measurement and reporting. In such cases, transmitting the one or more channel state information reports is in accordance with the modified channel state information measurement periodicity. Additionally, or alternatively, for discontinuous reception non-active time period, the network entity 105 may configure the UE 115 to measure the first channel state information reference signal during the discontinuous reception active time period 635. For instance, the one or more channel state information reports transmitted by the UE 115 may correspond to a first channel state information reference signal included in the subsequent discontinuous reception active time period 635. Thus, in this case, a reduction in total awake time 620 may result in power savings for the UE 115.

Figure 7:
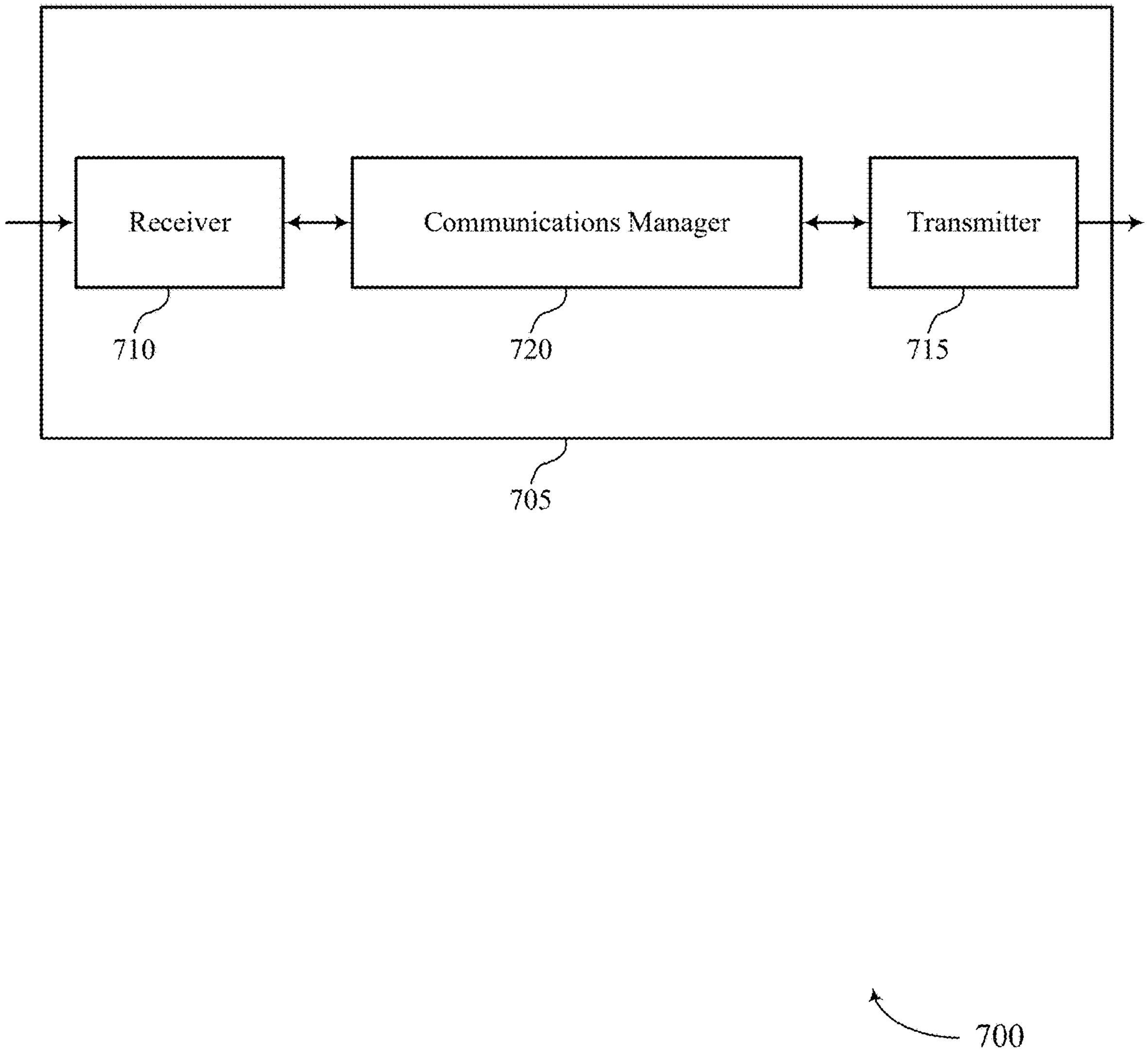
FIGS. 7 and 8 show block diagrams of devices that support measurement enhancement with WUS in accordance with one or more aspects of the present disclosure.

FIG. 7 shows a block diagram 700 of a device 705 that supports measurement enhancement with WUS in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to measurement enhancement with WUS). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to measurement enhancement with WUS). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of measurement enhancement with WUS as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for receiving a configuration for communicating with a network entity, where the configuration indicates a connected-mode discontinuous reception cycle, where each cycle includes a discontinuous reception active time period and a discontinuous reception inactive time period. The communications manager 720 is capable of, configured to, or operable to support a means for receiving control information that configures a WUS window for reception of a WUS, where reception of the WUS is in accordance with timing that is based on a WUS reference signal. The communications manager 720 is capable of, configured to, or operable to support a means for receiving the WUS or the WUS reference signal during the WUS window. The communications manager 720 is capable of, configured to, or operable to support a means for transmitting an uplink control signal prior to or at a beginning of a subsequent discontinuous reception active time period based on reception of the WUS or of the WUS reference signal.

Additionally, or alternatively, the communications manager 720 may support wireless communications in accordance with examples as disclosed herein. For example, the communications manager 720 is capable of, configured to, or operable to support a means for receiving a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals. The communications manager 720 is capable of, configured to, or operable to support a means for receiving control information that configures a WUS window for reception of a WUS. The communications manager 720 is capable of, configured to, or operable to support a means for receiving the WUS during the WUS window. The communications manager 720 is capable of, configured to, or operable to support a means for transmitting, during a subsequent discontinuous reception active time period and based on reception of the WUS, one or more channel state information reports corresponding to a subset of the quantity of channel state information reference signals.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced processing, reduced power consumption, and more efficient utilization of communication resources.

Figure 8:
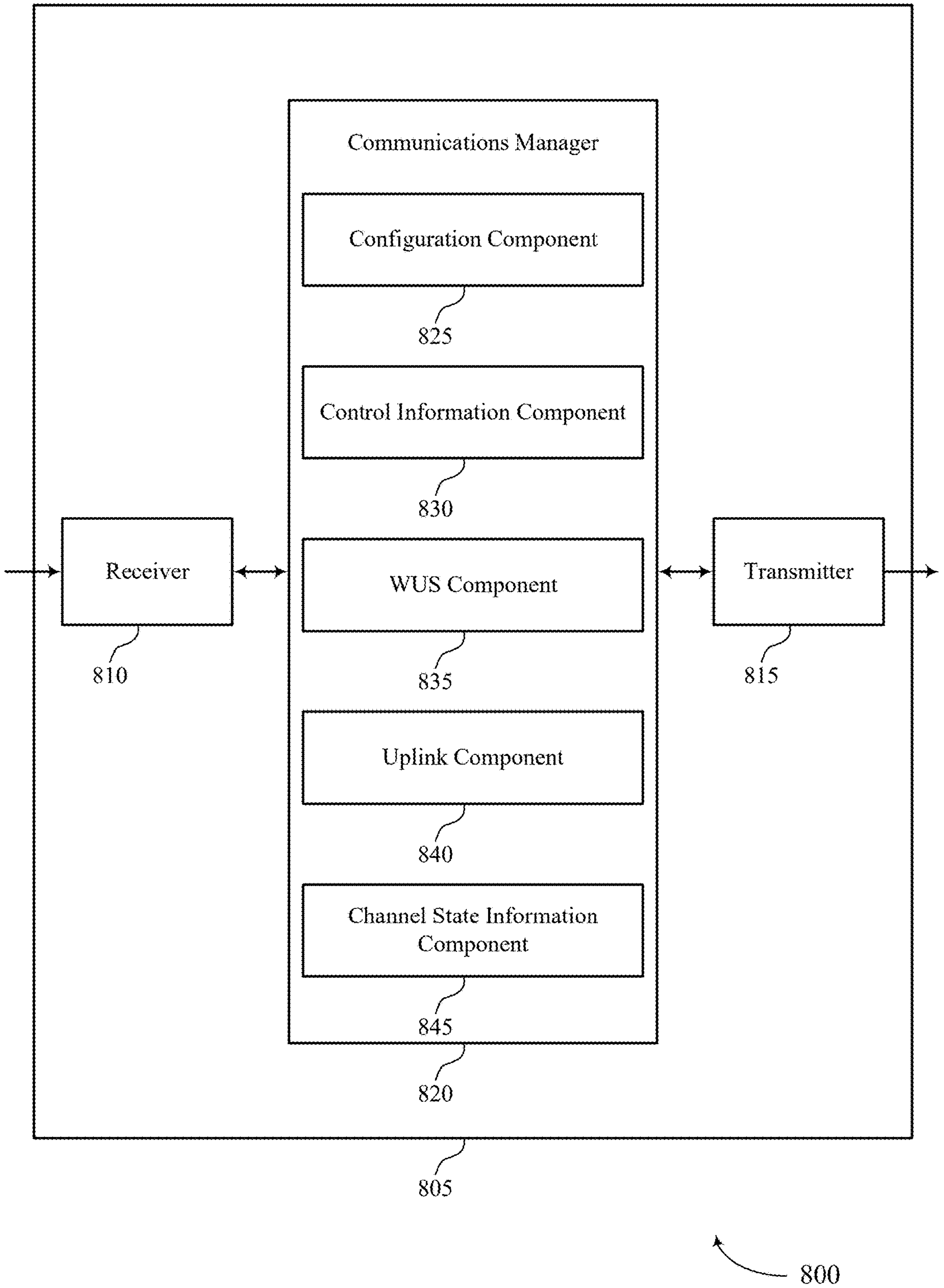

FIG. 8 shows a block diagram 800 of a device 805 that supports measurement enhancement with WUS in accordance with one or more aspects of the present disclosure. The device 805 may be an example of aspects of a device 705 or a UE 115 as described herein. The device 805 may include a receiver 810, a transmitter 815, and a communications manager 820. The device 805, or one of more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to measurement enhancement with WUS). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to measurement enhancement with WUS). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of measurement enhancement with WUS as described herein. For example, the communications manager 820 may include a configuration component 825, a control information component 830, a WUS component 835, an uplink component 840, a channel state information component 845, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The configuration component 825 is capable of, configured to, or operable to support a means for receiving a configuration for communicating with a network entity, where the configuration indicates a connected-mode discontinuous reception cycle, where each cycle includes a discontinuous reception active time period and a discontinuous reception inactive time period. The control information component 830 is capable of, configured to, or operable to support a means for receiving control information that configures a WUS window for reception of a WUS, where reception of the WUS is in accordance with timing that is based on a WUS reference signal. The WUS component 835 is capable of, configured to, or operable to support a means for receiving the WUS or the WUS reference signal during the WUS window. The uplink component 840 is capable of, configured to, or operable to support a means for transmitting an uplink control signal prior to or at a beginning of a subsequent discontinuous reception active time period based on reception of the WUS or of the WUS reference signal.

Additionally, or alternatively, the communications manager 820 may support wireless communications in accordance with examples as disclosed herein. The configuration component 825 is capable of, configured to, or operable to support a means for receiving a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals. The control information component 830 is capable of, configured to, or operable to support a means for receiving control information that configures a WUS window for reception of a WUS. The WUS component 835 is capable of, configured to, or operable to support a means for receiving the WUS during the WUS window. The channel state information component 845 is capable of, configured to, or operable to support a means for transmitting, during a subsequent discontinuous reception active time period and based on reception of the WUS, one or more channel state information reports corresponding to a subset of the quantity of channel state information reference signals.

Figure 9:
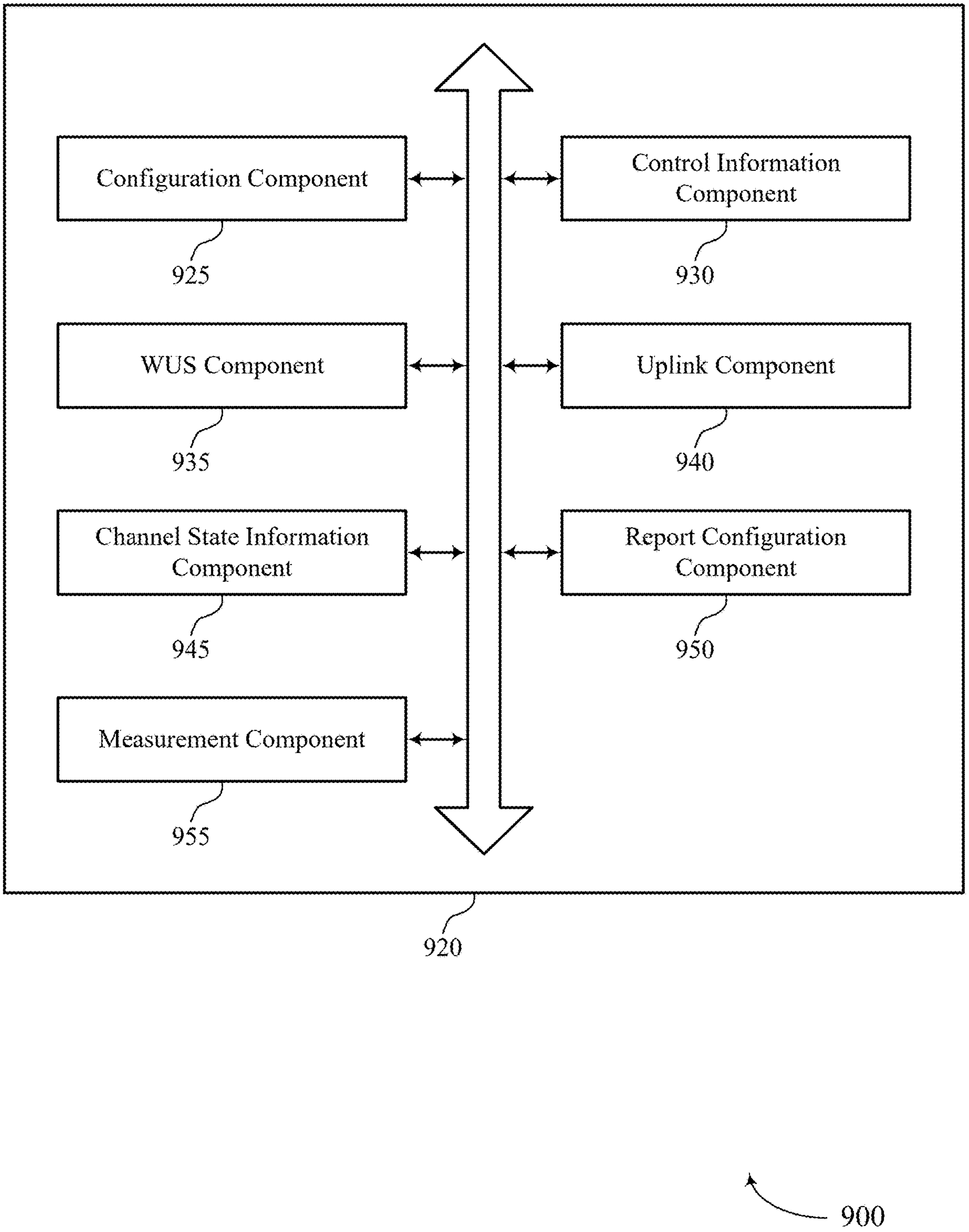
FIG. 9 shows a block diagram of a communications manager that supports measurement enhancement with WUS in accordance with one or more aspects of the present disclosure.

FIG. 9 shows a block diagram 900 of a communications manager 920 that supports measurement enhancement with WUS in accordance with one or more aspects of the present disclosure. The communications manager 920 may be an example of aspects of a communications manager 720, a communications manager 820, or both, as described herein. The communications manager 920, or various components thereof, may be an example of means for performing various aspects of measurement enhancement with WUS as described herein. For example, the communications manager 920 may include a configuration component 925, a control information component 930, a WUS component 935, an uplink component 940, a channel state information component 945, a report configuration component 950, a measurement component 955, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The configuration component 925 is capable of, configured to, or operable to support a means for receiving a configuration for communicating with a network entity, where the configuration indicates a connected-mode discontinuous reception cycle, where each cycle includes a discontinuous reception active time period and a discontinuous reception inactive time period. The control information component 930 is capable of, configured to, or operable to support a means for receiving control information that configures a WUS window for reception of a WUS, where reception of the WUS is in accordance with timing that is based on a WUS reference signal. The WUS component 935 is capable of, configured to, or operable to support a means for receiving the WUS or the WUS reference signal during the WUS window. The uplink component 940 is capable of, configured to, or operable to support a means for transmitting an uplink control signal prior to or at a beginning of a subsequent discontinuous reception active time period based on reception of the WUS or of the WUS reference signal.

In some examples, the report configuration component 950 is capable of, configured to, or operable to support a means for receiving a signal enabling periodic reporting of channel information, where the channel information includes a reference signal received power report or a channel state information report or both.

In some examples, to support receiving the WUS or the WUS reference signal, the WUS component 935 is capable of, configured to, or operable to support a means for receiving the WUS during the WUS window, the WUS indicating that the subsequent discontinuous reception active time period is scheduled to be empty, where transmitting the uplink control signal is based on the WUS and the signal enabling periodic reporting of the channel information.

In some examples, the WUS component 935 is capable of, configured to, or operable to support a means for monitoring for the WUS reference signal including a demodulation reference signal for link quality measurement. In some examples, the measurement component 955 is capable of, configured to, or operable to support a means for measuring one or more channel parameters based on the demodulation reference signal.

In some examples, transmitting the uplink control signal is based on the one or more channel parameters being greater than a threshold. In some examples, transmitting the uplink control signal is based on a difference in two subsequent measurements of the one or more channel parameters satisfying a threshold.

In some examples, to support receiving the WUS or the WUS reference signal, the WUS component 935 is capable of, configured to, or operable to support a means for receiving the WUS during the WUS window, the WUS indicating that a data transmission is scheduled for the subsequent discontinuous reception active time period.

In some examples, the uplink control signal is transmitted to report channel information based on a WUS demodulation reference signal, which is used to select a modulation and coding scheme of the data transmission in the subsequent discontinuous reception active time period. In some examples, the WUS component 935 is capable of, configured to, or operable to support a means for monitoring for the WUS reference signal including a demodulation reference signal during the WUS window, where the WUS is not received in the WUS window.

In some examples, the measurement component 955 is capable of, configured to, or operable to support a means for measuring a link quality based on the demodulation reference signal, where transmitting the uplink control signal is based on the link quality satisfying a threshold.

In some examples, the control information component 930 is capable of, configured to, or operable to support a means for receiving a radio resource control signal configuring a physical uplink control channel for transmitting the uplink control signal prior to or at the beginning of the subsequent discontinuous reception active time period. In some examples, the control information component 930 is capable of, configured to, or operable to support a means for receiving a radio resource control signal configuring a physical uplink control channel for transmitting the uplink control signal during an offset period from the beginning of the WUS window, where the offset period is great than a threshold.

In some examples, transmitting the uplink control signal is based on one or more of a radio resource control signal, a medium access control layer control element, an indication in the WUS, or any combination thereof.

Additionally, or alternatively, the communications manager 920 may support wireless communications in accordance with examples as disclosed herein. In some examples, the configuration component 925 is capable of, configured to, or operable to support a means for receiving a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals. In some examples, the control information component 930 is capable of, configured to, or operable to support a means for receiving control information that configures a WUS window for reception of a WUS. In some examples, the WUS component 935 is capable of, configured to, or operable to support a means for receiving the WUS during the WUS window. The channel state information component 945 is capable of, configured to, or operable to support a means for transmitting, during a subsequent discontinuous reception active time period and based on reception of the WUS, one or more channel state information reports corresponding to a subset of the quantity of channel state information reference signals.

In some examples, the configuration component 925 is capable of, configured to, or operable to support a means for receiving a modified channel state information measurement configuration for the discontinuous reception inactive time period based on a UE assistance information.

In some examples, the report configuration component 950 is capable of, configured to, or operable to support a means for receiving a signal enabling periodic reporting of channel information, where the channel information includes a reference signal received power report or a channel state information report or both. In some examples, the WUS indicates that the discontinuous reception active time period is scheduled to be empty. In some examples, transmitting the one or more channel state information reports is based on the WUS and the signal enabling periodic reporting of the channel information with a modified channel state information measurement configuration.

In some examples, the measurement component 955 is capable of, configured to, or operable to support a means for identifying a channel state information measurement periodicity for the discontinuous reception active time period. In some examples, the measurement component 955 is capable of, configured to, or operable to support a means for modifying the channel state information measurement periodicity based on a scaling factor for the discontinuous reception inactive time period, where transmitting the one or more channel state information reports is in accordance with the modified channel state information measurement periodicity.

In some examples, the one or more channel state information reports corresponds to a first channel state information reference signal included in the subsequent discontinuous reception active time period. In some examples, transmitting the one or more channel state information reports is based on one or more of a radio resource control signal, a medium access control layer control element, an indication in the WUS, or any combination thereof.

Figure 10:
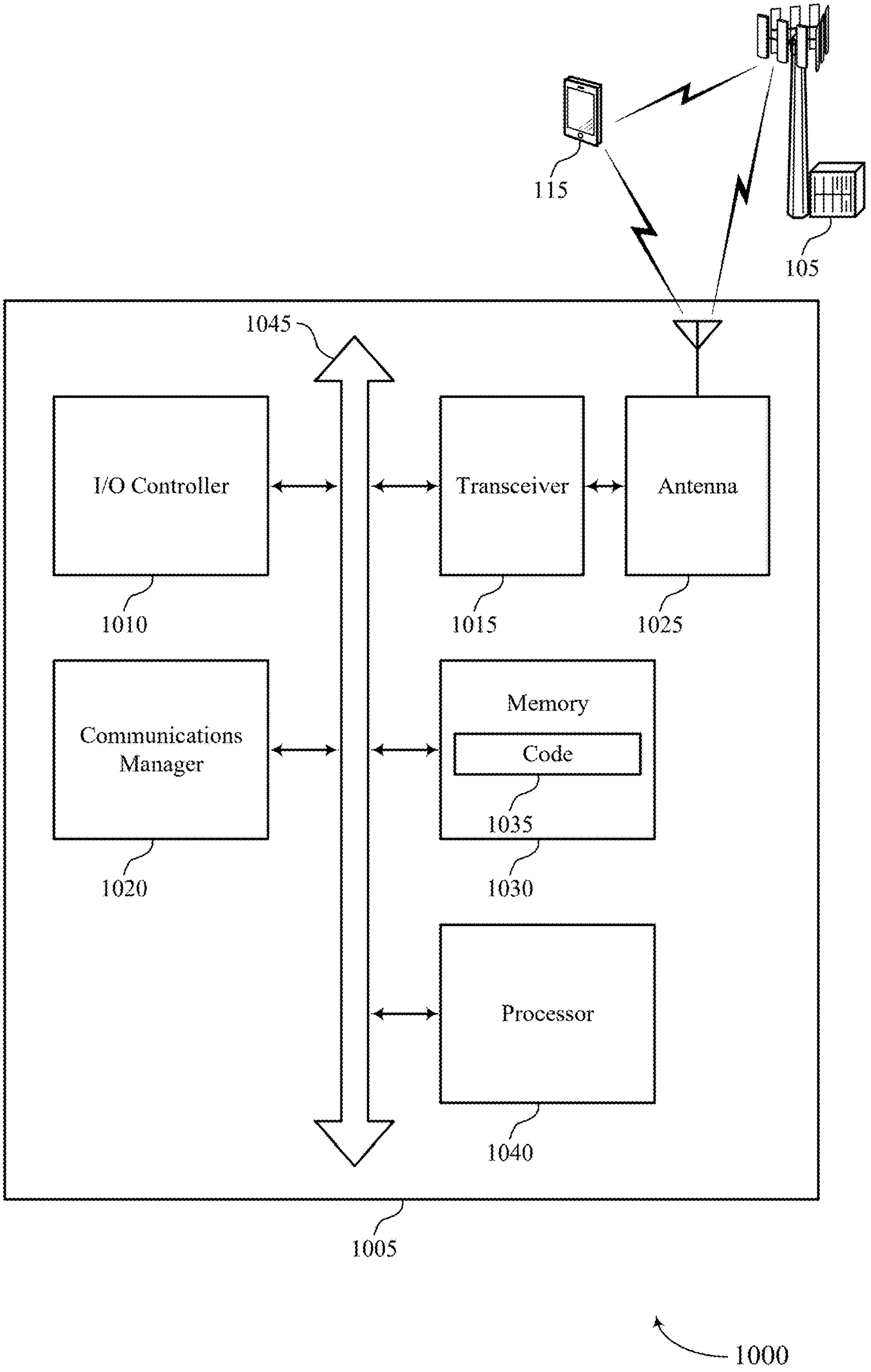
FIG. 10 shows a diagram of a system including a device that supports measurement enhancement with WUS in accordance with one or more aspects of the present disclosure.

FIG. 10 shows a diagram of a system 1000 including a device 1005 that supports measurement enhancement with WUS in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting measurement enhancement with WUS). For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors and the at least one memory 1030 may include multiple memories. One or more of the multiple processors may be coupled with one or more of the multiple memories, which may, individually or collectively, be configured to perform various functions herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code stored in the at least one memory 1030 or otherwise, to perform one or more of the functions described herein.

The communications manager 1020 may support wireless communications in accordance with examples as disclosed herein. For example, the communications manager 1020 is capable of, configured to, or operable to support a means for receiving a configuration for communicating with a network entity, where the configuration indicates a connected-mode discontinuous reception cycle, where each cycle includes a discontinuous reception active time period and a discontinuous reception inactive time period. The communications manager 1020 is capable of, configured to, or operable to support a means for receiving control information that configures a WUS window for reception of a WUS, where reception of the WUS is in accordance with timing that is based on a WUS reference signal. The communications manager 1020 is capable of, configured to, or operable to support a means for receiving the WUS or the WUS reference signal during the WUS window. The communications manager 1020 is capable of, configured to, or operable to support a means for transmitting an uplink control signal prior to or at a beginning of a subsequent discontinuous reception active time period based on reception of the WUS or of the WUS reference signal.

Additionally, or alternatively, the communications manager 1020 may support wireless communications in accordance with examples as disclosed herein. For example, the communications manager 1020 is capable of, configured to, or operable to support a means for receiving a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals. The communications manager 1020 is capable of, configured to, or operable to support a means for receiving control information that configures a WUS window for reception of a WUS. The communications manager 1020 is capable of, configured to, or operable to support a means for receiving the WUS during the WUS window. The communications manager 1020 is capable of, configured to, or operable to support a means for transmitting, during a subsequent discontinuous reception active time period and based on reception of the WUS, one or more channel state information reports corresponding to a subset of the quantity of channel state information reference signals.

By including or configuring the communications manager 1020 in accordance with examples as described herein, the device 1005 may support techniques for improved communication reliability, reduced latency, improved user experience related to reduced processing, reduced power consumption, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of measurement enhancement with WUS as described herein, or the at least one processor 1040 and the at least one memory 1030 may be otherwise configured to, individually or collectively, perform or support such operations.

Figure 11:
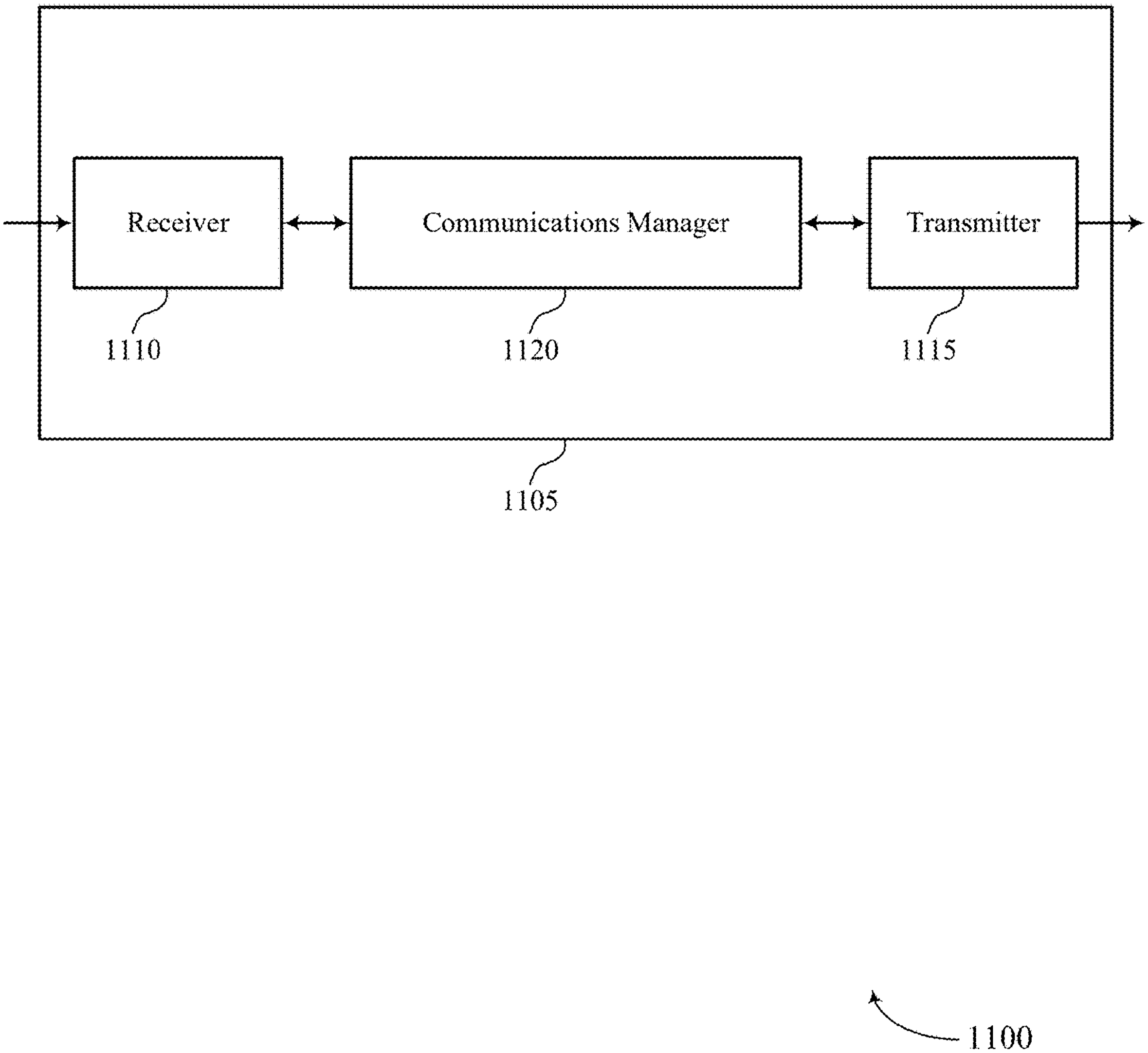
FIGS. 11 and 12 show block diagrams of devices that support measurement enhancement with WUS in accordance with one or more aspects of the present disclosure.

FIG. 11 shows a block diagram 1100 of a device 1105 that supports measurement enhancement with WUS in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter

1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of measurement enhancement with WUS as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 is capable of, configured to, or operable to support a means for transmitting a configuration for communicating with a UE, where the configuration indicates a connected-mode discontinuous reception cycle, where each cycle includes a discontinuous reception active time period and a discontinuous reception inactive time period. The communications manager 1120 is capable of, configured to, or operable to support a means for transmitting control information that configures a WUS window for reception of a WUS, where reception of the WUS is in accordance with timing that is based on a WUS reference signal. The communications manager 1120 is capable of, configured to, or operable to support a means for transmitting the WUS or the WUS reference signal during the WUS window. The communications manager 1120 is capable of, configured to, or operable to support a means for receiving an uplink control signal prior to or at a beginning of a subsequent discontinuous reception active time period based on reception of the WUS or of the WUS reference signal.

Additionally, or alternatively, the communications manager 1120 may support wireless communications in accordance with examples as disclosed herein. For example, the communications manager 1120 is capable of, configured to, or operable to support a means for transmitting a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals. The communications manager 1120 is capable of, configured to, or operable to support a means for transmitting control information that configures a WUS window for reception of a WUS. The communications manager 1120 is capable of, configured to, or operable to support a means for transmitting the WUS during the WUS window. The communications manager 1120 is capable of, configured to, or operable to support a means for receiving, during a subsequent discontinuous reception active time period and based on reception of the WUS, one or more channel state information reports corresponding to a subset of the quantity of channel state information reference signals.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for reduced processing, reduced power consumption, and more efficient utilization of communication resources.

Figure 12:
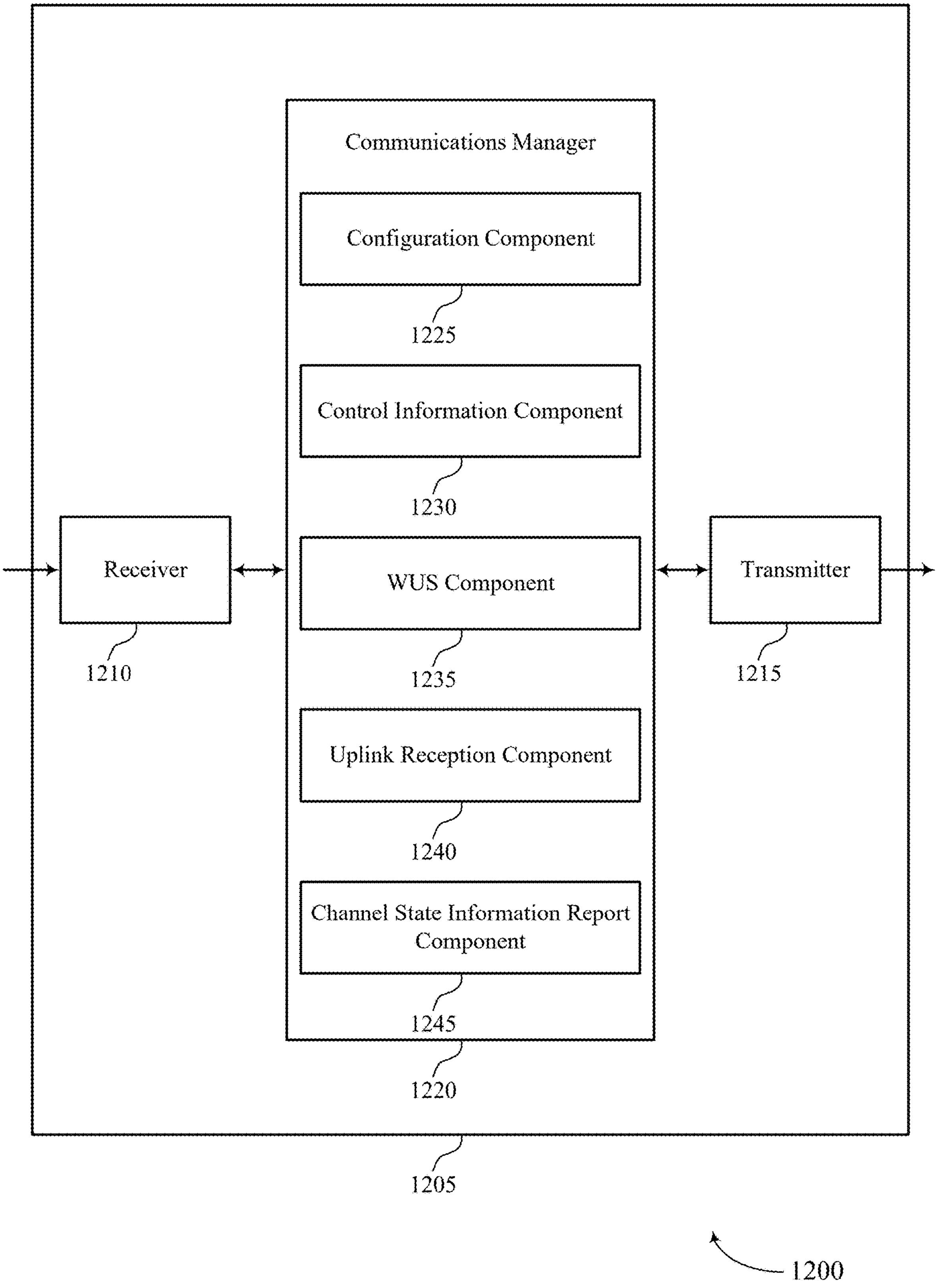

FIG. 12 shows a block diagram 1200 of a device 1205 that supports measurement enhancement with WUS in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one of more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of measurement enhancement with WUS as described herein. For example, the communications manager 1220 may include a configuration component 1225, a control information component 1230, a WUS component 1235, an uplink reception component 1240, a channel state information report component 1245, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The configuration component 1225 is capable of, configured to, or operable to support a means for transmitting a configuration for communicating with a UE, where the configuration indicates a connected-mode discontinuous reception cycle, where each cycle includes a discontinuous reception active time period and a discontinuous reception inactive time period. The control information component 1230 is capable of, configured to, or operable to support a means for transmitting control information that configures a WUS window for reception of a WUS, where reception of the WUS is in accordance with timing that is based on a WUS reference signal. The WUS component 1235 is capable of, configured to, or operable to support a means for transmitting the WUS or the WUS reference signal during the WUS window. The uplink reception component 1240 is capable of, configured to, or operable to support a means for receiving an uplink control signal prior to or at a beginning of a subsequent discontinuous reception active time period based on reception of the WUS or of the WUS reference signal.

Additionally, or alternatively, the communications manager 1220 may support wireless communications in accordance with examples as disclosed herein. The configuration component 1225 is capable of, configured to, or operable to support a means for transmitting a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals. The control information component 1230 is capable of, configured to, or operable to support a means for transmitting control information that configures a WUS window for reception of a WUS. The WUS component 1235 is capable of, configured to, or operable to support a means for transmitting the WUS during the WUS window. The channel state information report component 1245 is capable of, configured to, or operable to support a means for receiving, during a subsequent discontinuous reception active time period and based on reception of the WUS, one or more channel state information reports corresponding to a subset of the quantity of channel state information reference signals.

Figure 13:
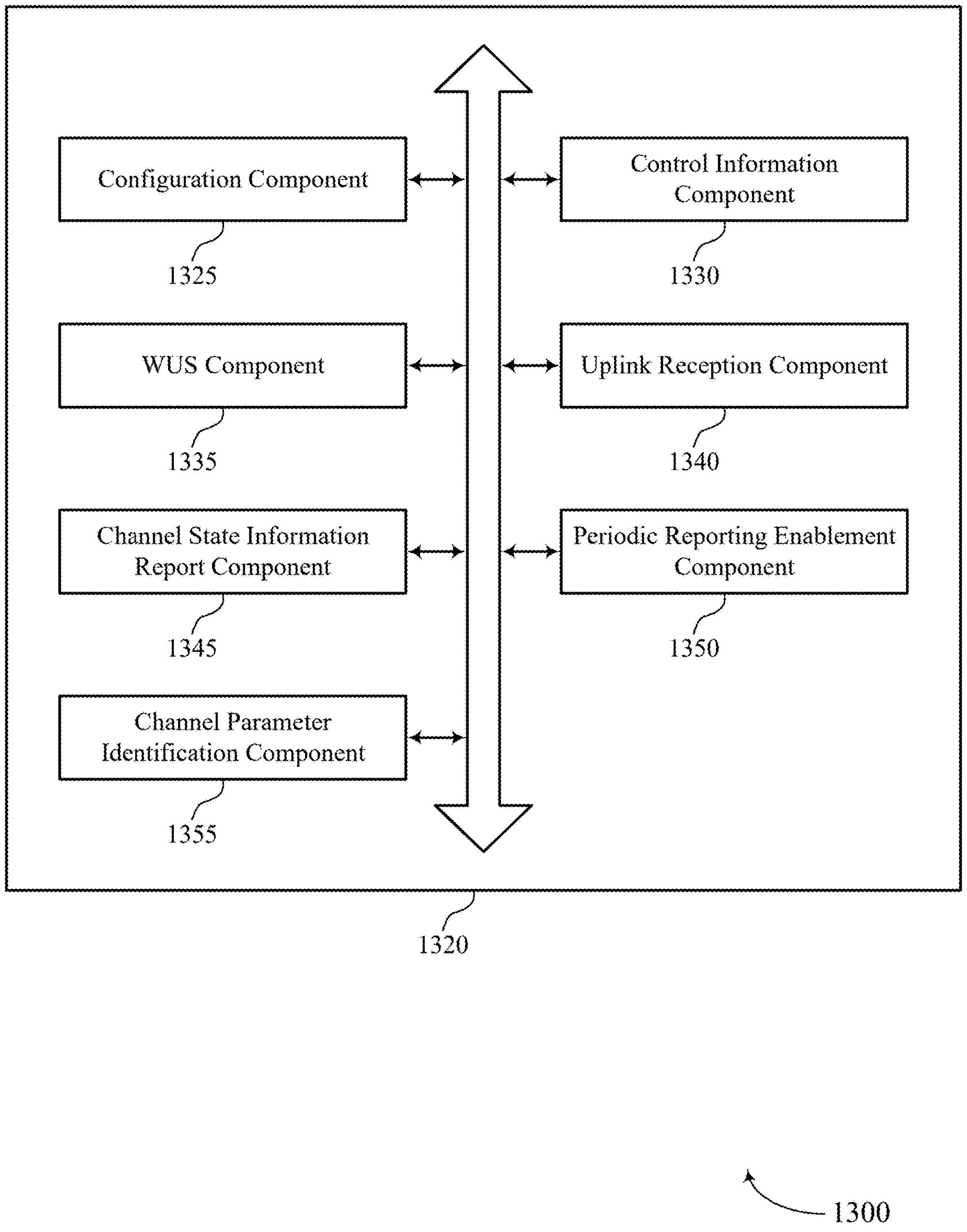
FIG. 13 shows a block diagram of a communications manager that supports measurement enhancement with WUS in accordance with one or more aspects of the present disclosure.

FIG. 13 shows a block diagram 1300 of a communications manager 1320 that supports measurement enhancement with WUS in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of measurement enhancement with WUS as described herein. For example, the communications manager 1320 may include a configuration component 1325, a control information component 1330, a WUS component 1335, an uplink reception component 1340, a channel state information report component 1345, a periodic reporting enablement component 1350, a channel parameter identification component 1355, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The configuration component 1325 is capable of, configured to, or operable to support a means for transmitting a configuration for communicating with a UE, where the configuration indicates a connected-mode discontinuous reception cycle, where each cycle includes a discontinuous reception active time period and a discontinuous reception inactive time period. The control information component 1330 is capable of, configured to, or operable to support a means for transmitting control information that configures a WUS window for reception of a WUS, where reception of the WUS is in accordance with timing that is based on a WUS reference signal. The WUS component 1335 is capable of, configured to, or operable to support a means for transmitting the WUS or the WUS reference signal during the WUS window. The uplink reception component 1340 is capable of, configured to, or operable to support a means for receiving an uplink control signal prior to or at a beginning of a subsequent discontinuous reception active time period based on reception of the WUS or of the WUS reference signal.

In some examples, the periodic reporting enablement component 1350 is capable of, configured to, or operable to support a means for transmitting a signal enabling periodic reporting of channel information, where the channel information includes a reference signal received power report or a channel state information report or both.

In some examples, to support transmitting the WUS or the WUS reference signal, the WUS component 1335 is capable of, configured to, or operable to support a means for transmitting the WUS during the WUS window, the WUS indicating that the subsequent discontinuous reception active time period is scheduled to be empty, where receiving the uplink control signal is based on the WUS and the signal enabling periodic reporting of the channel information.

In some examples, the channel parameter identification component 1355 is capable of, configured to, or operable to support a means for identifying one or more channel parameters based on the WUS reference signal including a demodulation reference signal for link quality measurement.

In some examples, receiving the uplink control signal is based on the one or more channel parameters being greater than a threshold. In some examples, receiving the uplink control signal is based on a difference in two subsequent measurements of the one or more channel parameters satisfying a threshold.

In some examples, to support transmitting the WUS or the WUS reference signal, the WUS component 1335 is capable of, configured to, or operable to support a means for transmitting the WUS during the WUS window, the WUS indicating that a data transmission is scheduled for the subsequent discontinuous reception active time period.

In some examples, the uplink control signal is transmitted to report channel information based on a WUS demodulation reference signal, which is used to select a modulation and coding scheme of the data transmission in the subsequent discontinuous reception active time period. In some examples, the WUS component 1335 is capable of, configured to, or operable to support a means for transmitting the WUS reference signal including a demodulation reference signal during the WUS window, where the WUS is not transmitted in the WUS window.

In some examples, receiving the uplink control signal is based on a link quality satisfying a threshold, the link quality being based on the demodulation reference signal. In some examples, the control information component 1330 is capable of, configured to, or operable to support a means for transmitting a radio resource control signal configuring a physical uplink control channel for transmitting the uplink control signal prior to or at the beginning of the subsequent discontinuous reception active time period.

In some examples, the control information component 1330 is capable of, configured to, or operable to support a means for transmitting a radio resource control signal configuring a physical uplink control channel for transmitting the uplink control signal during an offset period from the beginning of the WUS window, where the offset period is great than a threshold. In some examples, receiving the uplink control signal is based on one or more of a radio resource control signal, a medium access control layer control element, an indication in the WUS, or any combination thereof.

Additionally, or alternatively, the communications manager 1320 may support wireless communications in accordance with examples as disclosed herein. In some examples, the configuration component 1325 is capable of, configured to, or operable to support a means for transmitting a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals. In some examples, the control information component 1330 is capable of, configured to, or operable to support a means for transmitting control information that configures a WUS window for reception of a WUS. In some examples, the WUS component 1335 is capable of, configured to, or operable to support a means for transmitting the WUS during the WUS window. The channel state information report component 1345 is capable of, configured to, or operable to support a means for receiving, during a subsequent discontinuous reception active time period and based on reception of the WUS, one or more channel state information reports corresponding to a subset of the quantity of channel state information reference signals.

In some examples, the channel state information report component 1345 is capable of, configured to, or operable to support a means for transmitting a modified channel state information measurement configuration for the discontinuous reception inactive time period based on a UE assistance information. In some examples, the periodic reporting enablement component 1350 is capable of, configured to, or operable to support a means for transmitting a signal enabling periodic reporting of channel information, where the channel information includes a reference signal received power report or a channel state information report or both.

In some examples, the WUS indicates that the discontinuous reception active time period is scheduled to be empty. In some examples, receiving the one or more channel state information reports is based on the WUS and the signal enabling periodic reporting of the channel information with a modified channel state information measurement configuration.

In some examples, the channel state information report component 1345 is capable of, configured to, or operable to support a means for identifying a channel state information measurement periodicity for the discontinuous reception active time period. In some examples, the channel state information report component 1345 is capable of, configured to, or operable to support a means for modifying the channel state information measurement periodicity based on a scaling factor for the discontinuous reception inactive time period, where receiving the one or more channel state information reports is in accordance with the modified channel state information measurement periodicity.

In some examples, the one or more channel state information reports corresponds to a first channel state information reference signal included in the subsequent discontinuous reception active time period. In some examples, receiving the one or more channel state information reports is based on one or more of a radio resource control signal, a medium access control layer control element, an indication in the WUS, or any combination thereof.

Figure 14:
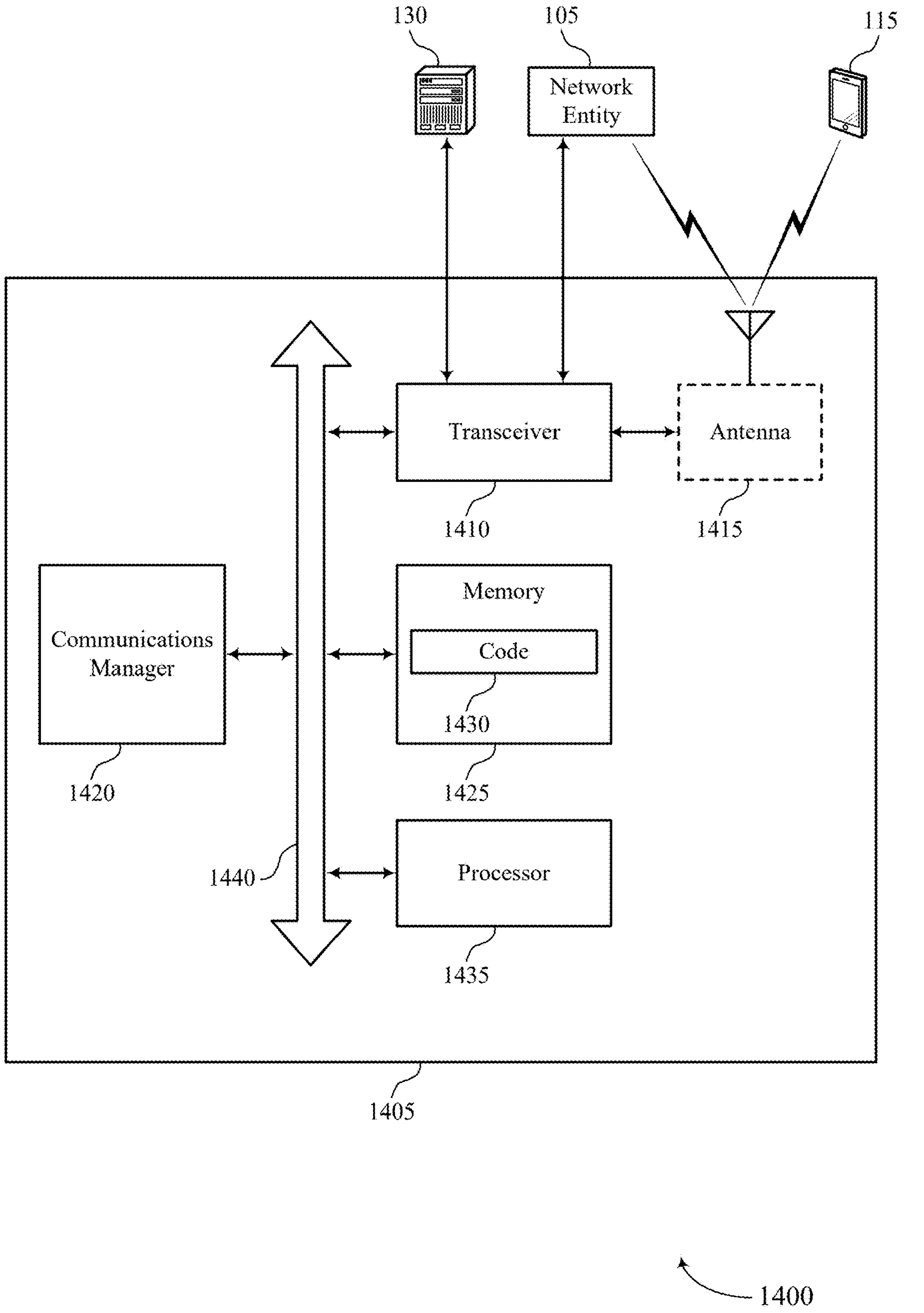
FIG. 14 shows a diagram of a system including a device that supports measurement enhancement with WUS in accordance with one or more aspects of the present disclosure.

FIG. 14 shows a diagram of a system 1400 including a device 1405 that supports measurement enhancement with WUS in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., a communication link 125, a backhaul communication link 120, a midhaul communication link 162, a fronthaul communication link 168).

The at least one memory 1425 may include RAM, ROM, or any combination thereof. The at least one memory 1425 may store computer-readable, computer-executable code 1430 including instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may contain, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting measurement enhancement with WUS). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425). In some examples, the at least one processor 1435 may include multiple processors and the at least one memory 1425 may include multiple memories. One or more of the multiple processors may be coupled with one or more of the multiple memories, which may, individually or collectively, be configured to perform various functions herein. In some examples, the at least one processor 1435 may be a component of a processing system, which may refer to a system (such as a series) of machines, circuitry (including, for example, one or both of processor circuitry (which may include the at least one processor 1435) and memory circuitry (which may include the at least one memory 1425)), or components, that receives or obtains inputs and processes the inputs to produce, generate, or obtain a set of outputs. The processing system may be configured to perform one or more of the functions described herein. For example, the at least one processor 1435 or a processing system including the at least one processor 1435 may be configured to, configurable to, or operable to cause the device 1405 to perform one or more of the functions described herein. Further, as described herein, being "configured to," being "configurable to," and being "operable to" may be used interchangeably and may be associated with a capability, when executing code stored in the at least one memory 1425 or otherwise, to perform one or more of the functions described herein.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 is capable of, configured to, or operable to support a means for transmitting a configuration for communicating with a UE, where the configuration indicates a connected-mode discontinuous reception cycle, where each cycle includes a discontinuous reception active time period and a discontinuous reception inactive time period. The communications manager 1420 is capable of, configured to, or operable to support a means for transmitting control information that configures a WUS window for reception of a WUS, where reception of the WUS is in accordance with timing that is based on a WUS reference signal. The communications manager 1420 is capable of, configured to, or operable to support a means for transmitting the WUS or the WUS reference signal during the WUS window. The communications manager 1420 is capable of, configured to, or operable to support a means for receiving an uplink control signal prior to or at a beginning of a subsequent discontinuous reception active time period based on reception of the WUS or of the WUS reference signal.

Additionally, or alternatively, the communications manager 1420 may support wireless communications in accordance with examples as disclosed herein. For example, the communications manager 1420 is capable of, configured to, or operable to support a means for transmitting a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals. The communications manager 1420 is capable of, configured to, or operable to support a means for transmitting control information that configures a WUS window for reception of a WUS. The communications manager 1420 is capable of, configured to, or operable to support a means for transmitting the WUS during the WUS window. The communications manager 1420 is capable of, configured to, or operable to support a means for receiving, during a subsequent discontinuous reception active time period and based on reception of the WUS, one or more channel state information reports corresponding to a subset of the quantity of channel state information reference signals.

By including or configuring the communications manager 1420 in accordance with examples as described herein, the device 1405 may support techniques for improved communication reliability, reduced latency, improved user experience related to reduced processing, reduced power consumption, more efficient utilization of communication resources, and improved coordination between devices.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of measurement enhancement with WUS as described herein, or the at least one processor 1435 and the at least one memory 1425 may be otherwise configured to, individually or collectively, perform or support such operations.

Figure 15:
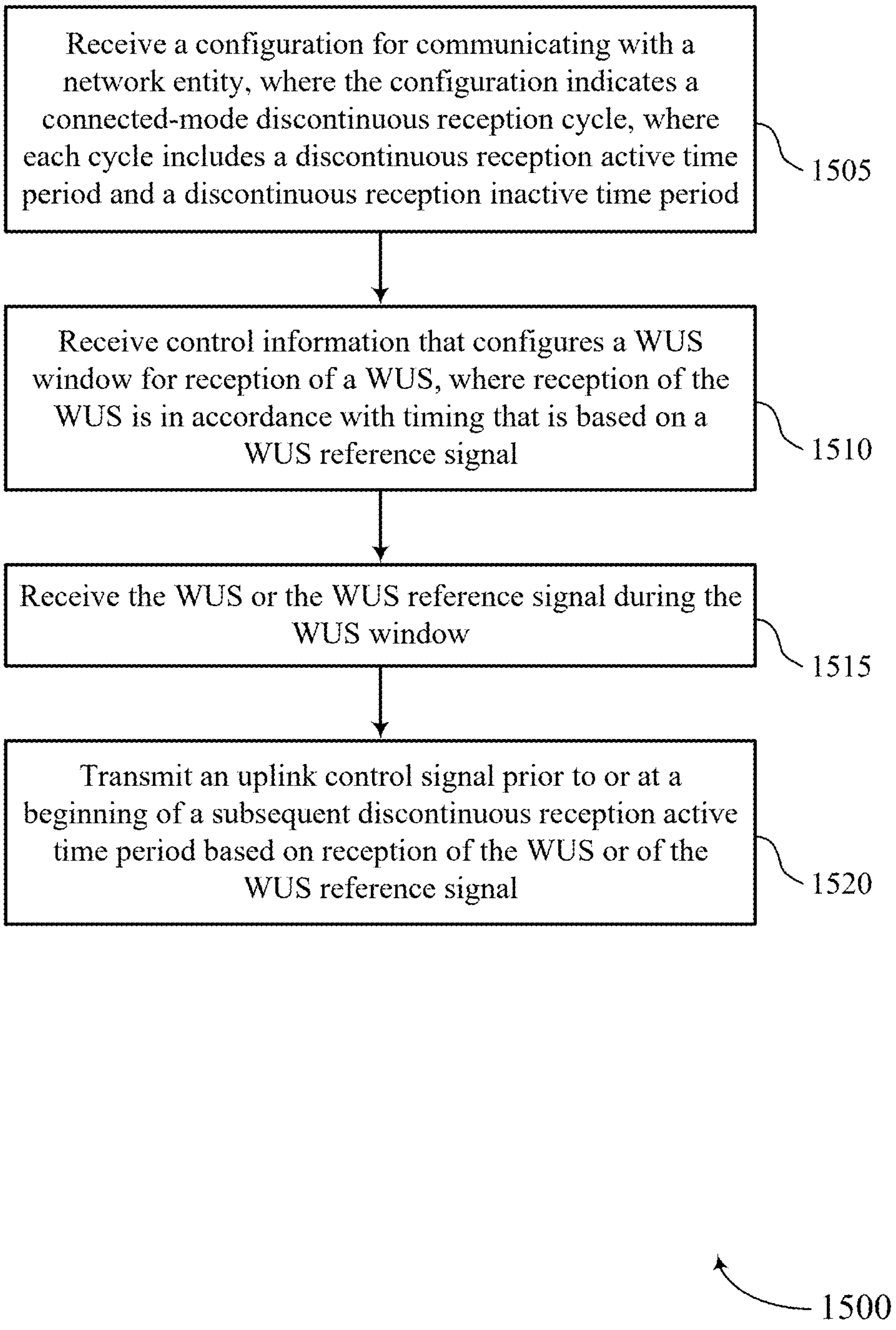
FIGS. 15 through 20 show flowcharts illustrating methods that support measurement enhancement with WUS in accordance with one or more aspects of the present disclosure.

FIG. 15 shows a flowchart illustrating a method 1500 that supports measurement enhancement with WUS in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a configuration for communicating with a network entity, where the configuration indicates a connected-mode discontinuous reception cycle, where each cycle includes a discontinuous reception active time period and a discontinuous reception inactive time period. The operations of block 1505 may be performed in accordance with examples as disclosed herein. In some examples, aspects of the operations of 1505 may be performed by a configuration component 925 as described with reference to FIG. 9.

At 1510, the method may include receiving control information that configures a WUS window for reception of a WUS, where reception of the WUS is in accordance with timing that is based on a WUS reference signal. The operations of block 1510 may be performed in accordance with examples as disclosed herein. In some examples, aspects of the operations of 1510 may be performed by a control information component 930 as described with reference to FIG. 9.

At 1515, the method may include receiving the WUS or the WUS reference signal during the WUS window. The operations of block 1515 may be performed in accordance with examples as disclosed herein. In some examples, aspects of the operations of 1515 may be performed by a WUS component 935 as described with reference to FIG. 9.

At 1520, the method may include transmitting an uplink control signal prior to or at a beginning of a subsequent discontinuous reception active time period based on reception of the WUS or of the WUS reference signal. The operations of block 1520 may be performed in accordance with examples as disclosed herein. In some examples, aspects of the operations of 1520 may be performed by an uplink component 940 as described with reference to FIG. 9.

Figure 16:
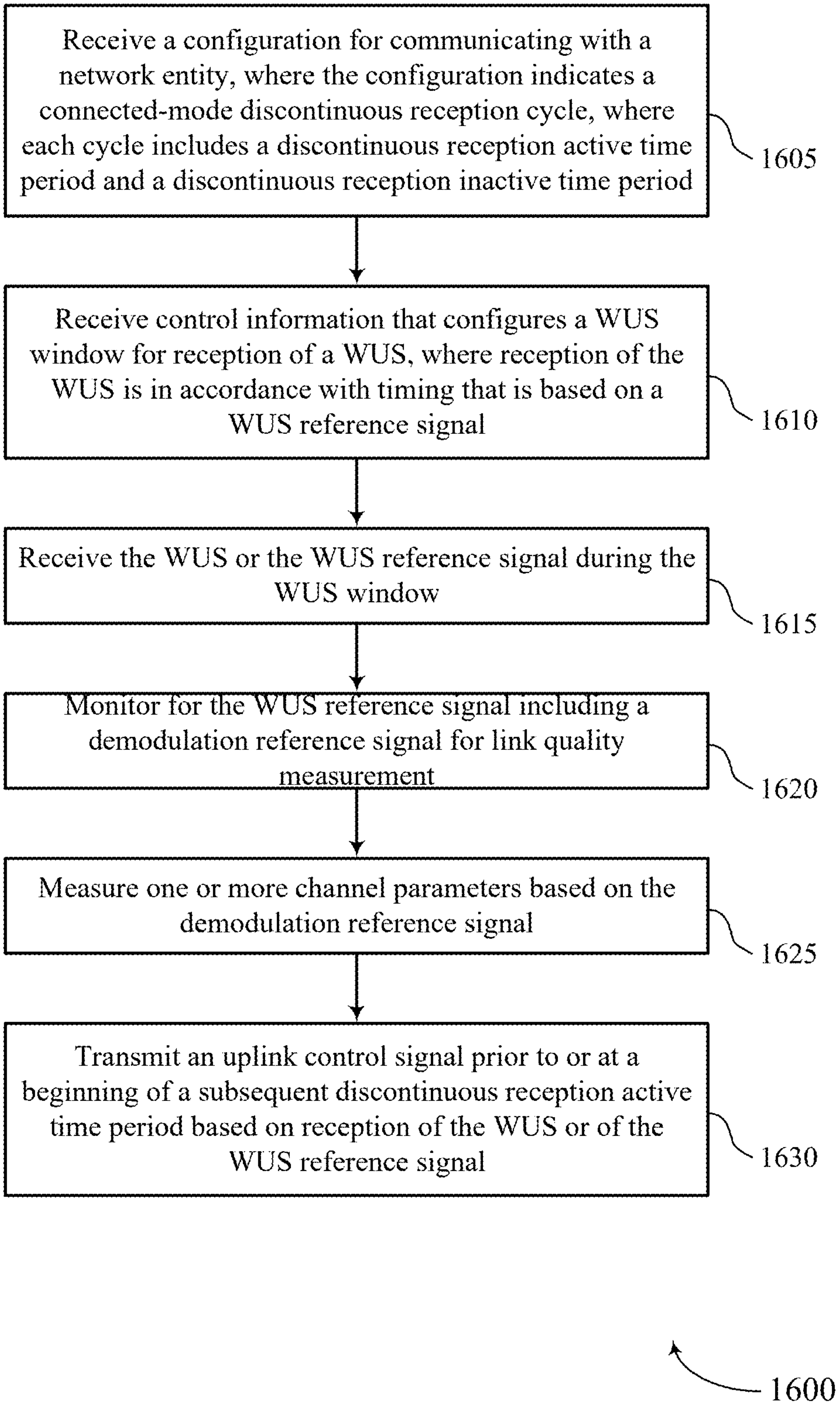

FIG. 16 shows a flowchart illustrating a method 1600 that supports measurement enhancement with WUS in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving a configuration for communicating with a network entity, where the configuration indicates a connected-mode discontinuous reception cycle, where each cycle includes a discontinuous reception active time period and a discontinuous reception inactive time period. The operations of block 1605 may be performed in accordance with examples as disclosed herein. In some examples, aspects of the operations of 1605 may be performed by a configuration component 925 as described with reference to FIG. 9.

At 1610, the method may include receiving control information that configures a WUS window for reception of a WUS, where reception of the WUS is in accordance with timing that is based on a WUS reference signal. The operations of block 1610 may be performed in accordance with examples as disclosed herein. In some examples, aspects of the operations of 1610 may be performed by a control information component 930 as described with reference to FIG. 9.

At 1615, the method may include receiving the WUS or the WUS reference signal during the WUS window. The operations of block 1615 may be performed in accordance with examples as disclosed herein. In some examples, aspects of the operations of 1615 may be performed by a WUS component 935 as described with reference to FIG. 9.

At 1620, the method may include monitoring for the WUS reference signal including a demodulation reference signal for link quality measurement. The operations of block 1620 may be performed in accordance with examples as disclosed herein. In some examples, aspects of the operations of 1620 may be performed by a WUS component 935 as described with reference to FIG. 9.

At 1625, the method may include measuring one or more channel parameters based on the demodulation reference signal. The operations of block 1625 may be performed in accordance with examples as disclosed herein. In some examples, aspects of the operations of 1625 may be performed by a measurement component 955 as described with reference to FIG. 9.

At 1630, the method may include transmitting an uplink control signal prior to or at a beginning of a subsequent discontinuous reception active time period based on reception of the WUS or of the WUS reference signal. The operations of block 1630 may be performed in accordance with examples as disclosed herein. In some examples, aspects of the operations of 1630 may be performed by an uplink component 940 as described with reference to FIG. 9.

Figure 17:
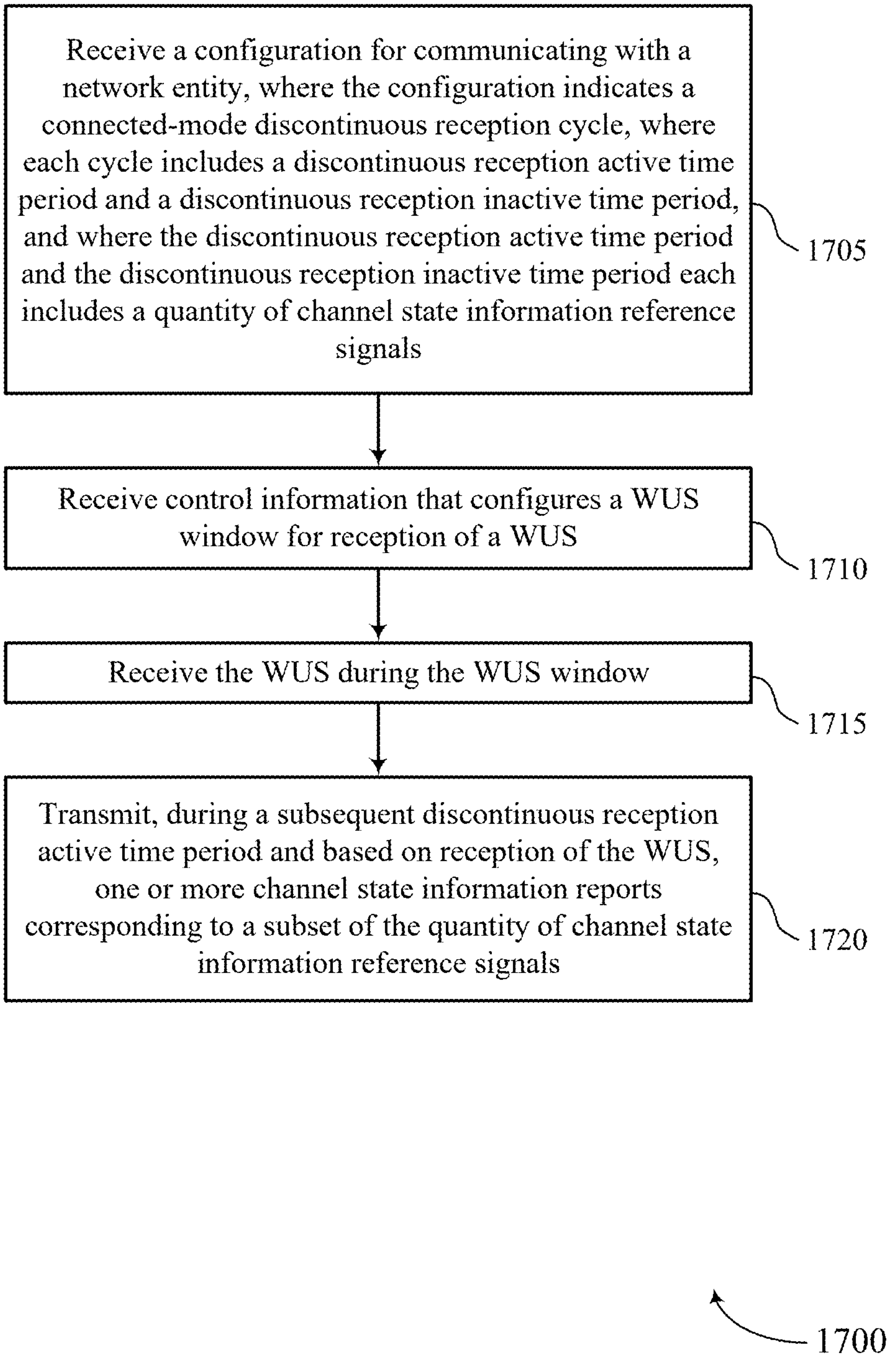

FIG. 17 shows a flowchart illustrating a method 1700 that supports measurement enhancement with WUS in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals. The operations of block 1705 may be performed in accordance with examples as disclosed herein. In some examples, aspects of the operations of 1705 may be performed by a configuration component 925 as described with reference to FIG. 9.

At 1710, the method may include receiving control information that configures a WUS window for reception of a WUS. The operations of block 1710 may be performed in accordance with examples as disclosed herein. In some examples, aspects of the operations of 1710 may be performed by a control information component 930 as described with reference to FIG. 9.

At 1715, the method may include receiving the WUS during the WUS window. The operations of block 1715 may be performed in accordance with examples as disclosed herein. In some examples, aspects of the operations of 1715 may be performed by a WUS component 935 as described with reference to FIG. 9.

At 1720, the method may include transmitting, during a subsequent discontinuous reception active time period and based on reception of the WUS, one or more channel state information reports corresponding to a subset of the quantity of channel state information reference signals. The operations of block 1720 may be performed in accordance with examples as disclosed herein. In some examples, aspects of the operations of 1720 may be performed by a channel state information component 945 as described with reference to FIG. 9.

Figure 18:
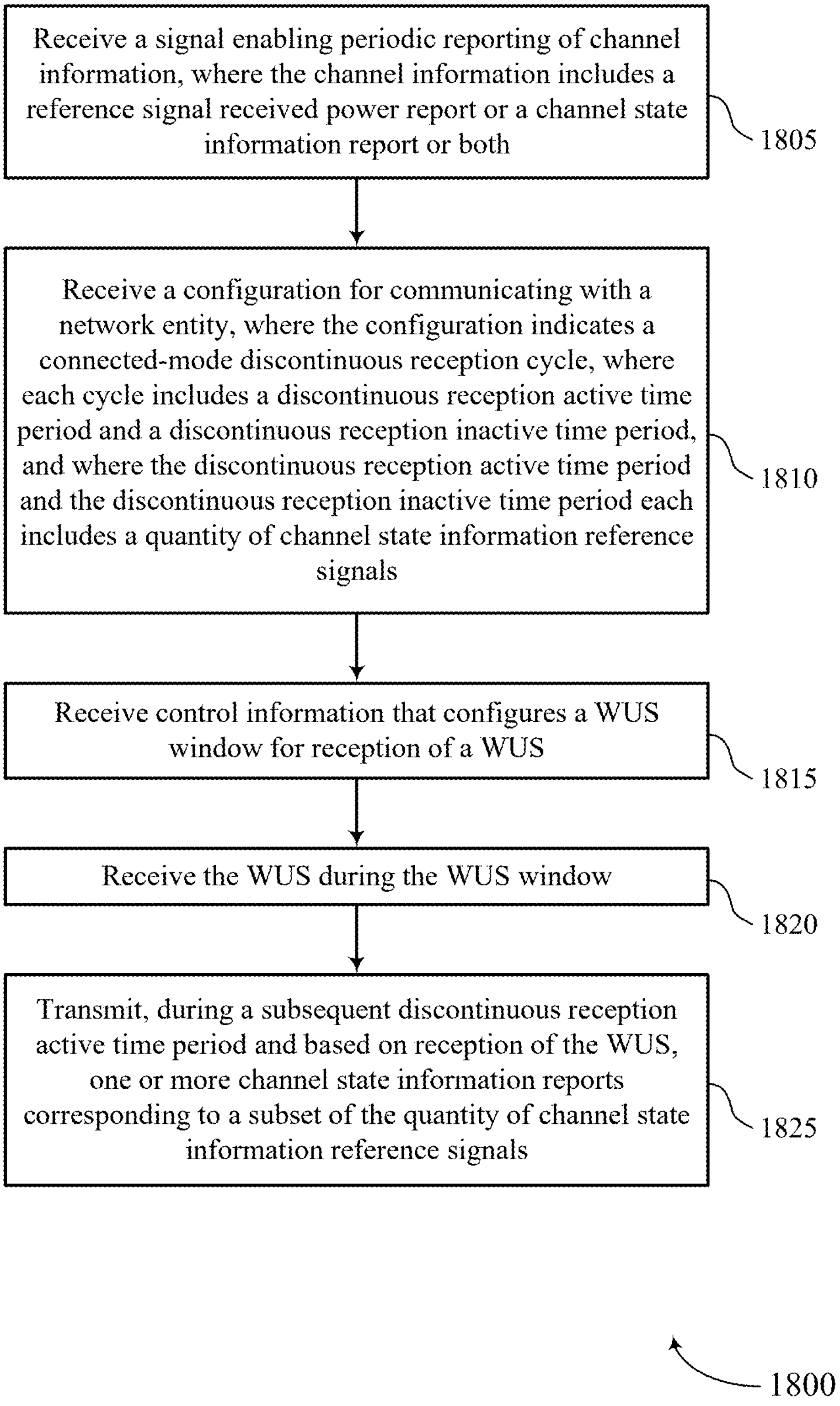

FIG. 18 shows a flowchart illustrating a method 1800 that supports measurement enhancement with WUS in accordance with one or more aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1805, the method may include receiving a signal enabling periodic reporting of channel information, where the channel information includes a reference signal received power report or a channel state information report or both. The operations of block 1805 may be performed in accordance with examples as disclosed herein. In some examples, aspects of the operations of 1805 may be performed by a report configuration component 950 as described with reference to FIG. 9.

At 1810, the method may include receiving a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals. The operations of block 1810 may be performed in accordance with examples as disclosed herein. In some examples, aspects of the operations of 1810 may be performed by a configuration component 925 as described with reference to FIG. 9.

At 1815, the method may include receiving control information that configures a WUS window for reception of a WUS. The operations of block 1815 may be performed in accordance with examples as disclosed herein. In some examples, aspects of the operations of 1815 may be performed by a control information component 930 as described with reference to FIG. 9.

At 1820, the method may include receiving the WUS during the WUS window. The operations of block 1820 may be performed in accordance with examples as disclosed herein. In some examples, aspects of the operations of 1820 may be performed by a WUS component 935 as described with reference to FIG. 9.

At 1825, the method may include transmitting, during a subsequent discontinuous reception active time period and based on reception of the WUS, one or more channel state information reports corresponding to a subset of the quantity of channel state information reference signals. The operations of block 1825 may be performed in accordance with examples as disclosed herein. In some examples, aspects of the operations of 1825 may be performed by a channel state information component 945 as described with reference to FIG. 9.

Figure 19:
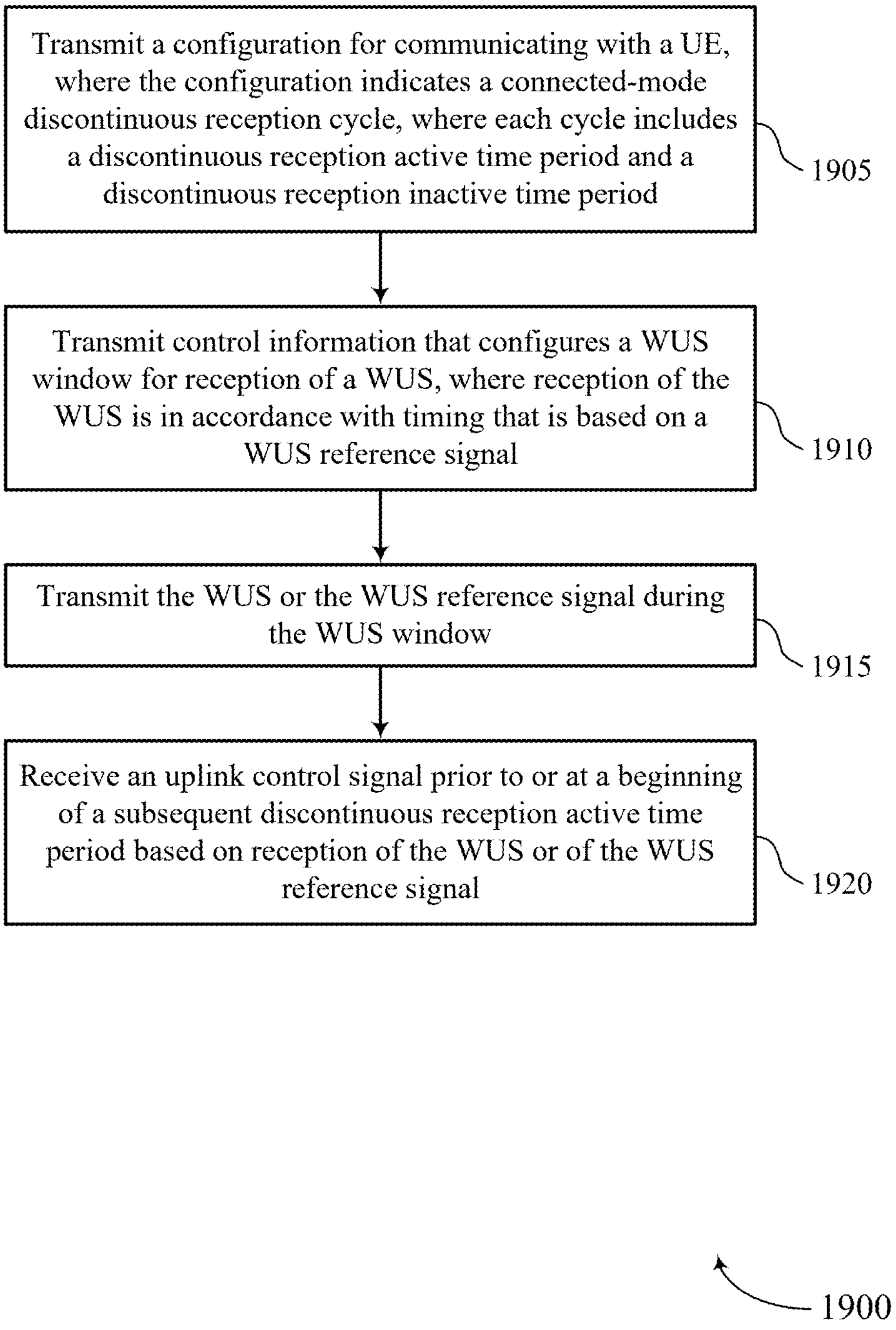

FIG. 19 shows a flowchart illustrating a method 1900 that supports measurement enhancement with WUS in accordance with one or more aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include transmitting a configuration for communicating with a UE, where the configuration indicates a connected-mode discontinuous reception cycle, where each cycle includes a discontinuous reception active time period and a discontinuous reception inactive time period. The operations of block 1905 may be performed in accordance with examples as disclosed herein. In some examples, aspects of the operations of 1905 may be performed by a configuration component 1325 as described with reference to FIG. 13.

At 1910, the method may include transmitting control information that configures a WUS window for reception of a WUS, where reception of the WUS is in accordance with timing that is based on a WUS reference signal. The operations of block 1910 may be performed in accordance with examples as disclosed herein. In some examples, aspects of the operations of 1910 may be performed by a control information component 1330 as described with reference to FIG. 13.

At 1915, the method may include transmitting the WUS or the WUS reference signal during the WUS window. The operations of block 1915 may be performed in accordance with examples as disclosed herein. In some examples, aspects of the operations of 1915 may be performed by a WUS component 1335 as described with reference to FIG. 13.

At 1920, the method may include receiving an uplink control signal prior to or at a beginning of a subsequent discontinuous reception active time period based on reception of the WUS or of the WUS reference signal. The operations of block 1920 may be performed in accordance with examples as disclosed herein. In some examples, aspects of the operations of 1920 may be performed by an uplink reception component 1340 as described with reference to FIG. 13.

Figure 20:
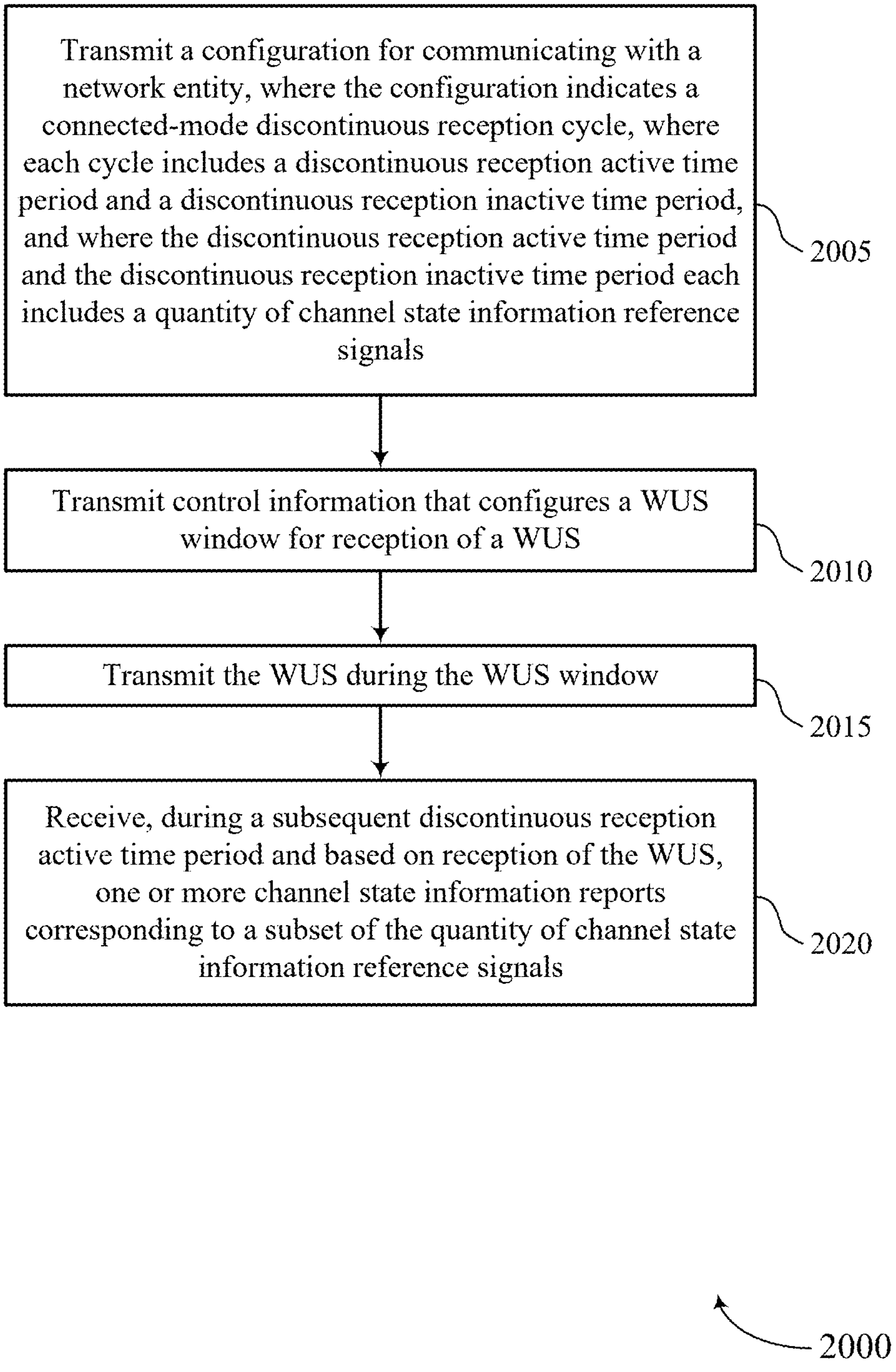

FIG. 20 shows a flowchart illustrating a method 2000 that supports measurement enhancement with WUS in accordance with one or more aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include transmitting a configuration for communicating with a network entity, where the configuration indicates a connected-mode discontinuous reception cycle, where each cycle includes a discontinuous reception active time period and a discontinuous reception inactive time period, and where the discontinuous reception active time period and the discontinuous reception inactive time period each includes a quantity of channel state information reference signals. The operations of block 2005 may be performed in accordance with examples as disclosed herein. In some examples, aspects of the operations of 2005 may be performed by a configuration component 1325 as described with reference to FIG. 13.

At 2010, the method may include transmitting control information that configures a WUS window for reception of a WUS. The operations of block 2010 may be performed in accordance with examples as disclosed herein. In some examples, aspects of the operations of 2010 may be performed by a control information component 1330 as described with reference to FIG. 13.

At 2015, the method may include transmitting the WUS during the WUS window. The operations of block 2015 may be performed in accordance with examples as disclosed herein. In some examples, aspects of the operations of 2015 may be performed by a WUS component 1335 as described with reference to FIG. 13.

At 2020, the method may include receiving, during a subsequent discontinuous reception active time period and based on reception of the WUS, one or more channel state information reports corresponding to a subset of the quantity of channel state information reference signals. The operations of block 2020 may be performed in accordance with examples as disclosed herein. In some examples, aspects of the operations of 2020 may be performed by a channel state information report component 1345 as described with reference to FIG. 13.

The following provides an overview of aspects of the present disclosure:

Aspect 1: A method for wireless communications at a UE, comprising: receiving a configuration for communicating with a network entity, wherein the configuration indicates a connected-mode discontinuous reception cycle, wherein each cycle includes a discontinuous reception active time period and a discontinuous reception inactive time period; receiving control information that configures a wake up signal (WUS) window for reception of a WUS, wherein reception of the WUS is in accordance with timing that is based on a WUS reference signal; receiving the WUS or the WUS reference signal during the WUS window; and transmitting an uplink control signal prior to or at a beginning of a subsequent discontinuous reception active time period based at least in part on reception of the WUS or of the WUS reference signal.

Aspect 2: The method of aspect 1, further comprising: receiving a signal enabling periodic reporting of channel information, wherein the channel information comprises a reference signal received power report or a channel state information report or both.

Aspect 3: The method of aspect 2, wherein receiving the WUS or the WUS reference signal further comprises: receiving the WUS during the WUS window, the WUS indicating that the subsequent discontinuous reception active time period is scheduled to be empty, wherein transmitting the uplink control signal is based at least in part on the WUS and the signal enabling periodic reporting of the channel information.

Aspect 4: The method of any of aspects 1 through 3, further comprising: monitoring for the WUS reference signal comprising a demodulation reference signal for link quality measurement; and measuring one or more channel parameters based at least in part on the demodulation reference signal.

Aspect 5: The method of aspect 4, wherein transmitting the uplink control signal is based at least in part on the one or more channel parameters being greater than a threshold.

Aspect 6: The method of any of aspects 4 through 5, wherein transmitting the uplink control signal is based at least in part on a difference in two subsequent measurements of the one or more channel parameters satisfying a threshold.

Aspect 7: The method of any of aspects 1 through 6, wherein receiving the WUS or the WUS reference signal further comprises: receiving the WUS during the WUS window, the WUS indicating that a data transmission is scheduled for the subsequent discontinuous reception active time period.

Aspect 8: The method of aspect 7, wherein the uplink control signal is transmitted to report the channel information based at least in part on the WUS demodulation reference signal, which is used to select a modulation and coding scheme of the data transmission in the subsequent discontinuous reception active time period.

Aspect 9: The method of any of aspects 1 through 8, further comprising: monitoring for the WUS reference signal comprising a demodulation reference signal during the WUS window, wherein the WUS is not received in the WUS window.

Aspect 10: The method of aspect 9, further comprising: measuring a link quality based at least in part on the demodulation reference signal, wherein transmitting the uplink control signal is based at least in part on the link quality satisfying a threshold.

Aspect 11: The method of any of aspects 1 through 10, further comprising: receiving a radio resource control signal configuring a physical uplink control channel for transmitting the uplink control signal prior to or at the beginning of the subsequent discontinuous reception active time period.

Aspect 12: The method of any of aspects 1 through 11, further comprising: receiving a radio resource control signal configuring a physical uplink control channel for transmitting the uplink control signal during an offset period from the beginning of the WUS window, wherein the offset period is great than a threshold.

Aspect 13: The method of any of aspects 1 through 12, wherein transmitting the uplink control signal is based at least in part on one or more of a radio resource control signal, a medium access control layer control element, an indication in the WUS, or any combination thereof.

Aspect 14: A method for wireless communications at a UE, comprising: receiving a configuration for communicating with a network entity, wherein the configuration indicates a connected-mode discontinuous reception cycle, wherein each cycle includes a discontinuous reception active time period and a discontinuous reception inactive time period, and wherein the discontinuous reception active time period and the discontinuous reception inactive time period each comprises a quantity of channel state information reference signals; receiving control information that configures a wake up signal (WUS) window for reception of a WUS; receiving the WUS during the WUS window; and transmitting, during a subsequent discontinuous reception active time period and based at least in part on reception of the WUS, one or more channel state information reports corresponding to a subset of the quantity of channel state information reference signals.

Aspect 15: The method of aspect 14, further comprising: receiving a modified channel state information measurement configuration for the discontinuous reception inactive time period based at least in part on a UE assistance information.

Aspect 16: The method of any of aspects 14 through 15, further comprising: receiving a signal enabling periodic reporting of channel information, wherein the channel information comprises a reference signal received power report or a channel state information report or both.

Aspect 17: The method of aspect 16, wherein the WUS indicates that the discontinuous reception active time period is scheduled to be empty, transmitting the one or more channel state information reports is based at least in part on the WUS and the signal enabling periodic reporting of the channel information with the modified channel state information measurement configuration.

Aspect 18: The method of any of aspects 14 through 17, further comprising: identifying a channel state information measurement periodicity for the discontinuous reception active time period; and modifying the channel state information measurement periodicity based at least in part on a scaling factor for the discontinuous reception inactive time period, wherein transmitting the one or more channel state information reports is in accordance with the modified channel state information measurement periodicity.

Aspect 19: The method of any of aspects 14 through 18, wherein the one or more channel state information reports corresponds to a first channel state information reference signal included in the subsequent discontinuous reception active time period.

Aspect 20: The method of any of aspects 14 through 19, wherein transmitting the one or more channel state information reports is based at least in part on one or more of a radio resource control signal, a medium access control layer control element, an indication in the WUS, or any combination thereof.

Aspect 21: A method for wireless communications at a network entity, comprising: transmitting a configuration for communicating with a UE, wherein the configuration indicates a connected-mode discontinuous reception cycle, wherein each cycle includes a discontinuous reception active time period and a discontinuous reception inactive time period; transmitting control information that configures a wake up signal (WUS) window for reception of a WUS, wherein reception of the WUS is in accordance with timing that is based on a WUS reference signal; transmitting the WUS or the WUS reference signal during the WUS window; and receiving an uplink control signal prior to or at a beginning of a subsequent discontinuous reception active time period based at least in part on reception of the WUS or of the WUS reference signal.

Aspect 22: The method of aspect 21, further comprising: transmitting a signal enabling periodic reporting of channel information, wherein the channel information comprises a reference signal received power report or a channel state information report or both.

Aspect 23: The method of aspect 22, wherein transmitting the WUS or the WUS reference signal further comprises: transmitting the WUS during the WUS window, the WUS indicating that the subsequent discontinuous reception active time period is scheduled to be empty, wherein receiving the uplink control signal is based at least in part on the WUS and the signal enabling periodic reporting of the channel information.

Aspect 24: The method of any of aspects 21 through 23, further comprising: identifying one or more channel parameters based at least in part on the WUS reference signal comprising a demodulation reference signal for link quality measurement.

Aspect 25: The method of aspect 24, wherein receiving the uplink control signal is based at least in part on the one or more channel parameters being greater than a threshold.

Aspect 26: The method of any of aspects 24 through 25, wherein receiving the uplink control signal is based at least in part on a difference in two subsequent measurements of the one or more channel parameters satisfying a threshold.

Aspect 27: The method of any of aspects 21 through 26, wherein transmitting the WUS or the WUS reference signal further comprises: transmitting the WUS during the WUS window, the WUS indicating that a data transmission is scheduled for the subsequent discontinuous reception active time period.

Aspect 28: The method of aspect 27, wherein the uplink control signal is transmitted to report the channel information based at least in part on the WUS demodulation reference signal, which is used to select a modulation and coding scheme of the data transmission in the subsequent discontinuous reception active time period.

Aspect 29: The method of any of aspects 21 through 28, further comprising: transmitting the WUS reference signal comprising a demodulation reference signal during the WUS window, wherein the WUS is not transmitted in the WUS window.

Aspect 30: The method of aspect 29, wherein receiving the uplink control signal is based at least in part on a link quality satisfying a threshold, the link quality being based at least in part on the demodulation reference signal.

Aspect 31: The method of any of aspects 21 through 30, further comprising: transmitting a radio resource control signal configuring a physical uplink control channel for transmitting the uplink control signal prior to or at the beginning of the subsequent discontinuous reception active time period.

Aspect 32: The method of any of aspects 21 through 31, further comprising: transmitting a radio resource control signal configuring a physical uplink control channel for transmitting the uplink control signal during an offset period from the beginning of the WUS window, wherein the offset period is great than a threshold.

Aspect 33: The method of any of aspects 21 through 32, wherein receiving the uplink control signal is based at least in part on one or more of a radio resource control signal, a medium access control layer control element, an indication in the WUS, or any combination thereof.

Aspect 34: A method for wireless communications at a network entity, comprising: transmitting a configuration for communicating with a network entity, wherein the configuration indicates a connected-mode discontinuous reception cycle, wherein each cycle includes a discontinuous reception active time period and a discontinuous reception inactive time period, and wherein the discontinuous reception active time period and the discontinuous reception inactive time period each comprises a quantity of channel state information reference signals; transmitting control information that configures a wake up signal (WUS) window for reception of a WUS; transmitting the WUS during the WUS window; and receiving, during a subsequent discontinuous reception active time period and based at least in part on reception of the WUS, one or more channel state information reports corresponding to a subset of the quantity of channel state information reference signals.

Aspect 35: The method of aspect 34, further comprising: transmitting a modified channel state information measurement configuration for the discontinuous reception inactive time period based at least in part on a UE assistance information.

Aspect 36: The method of any of aspects 34 through 35, further comprising: transmitting a signal enabling periodic reporting of channel information, wherein the channel information comprises a reference signal received power report or a channel state information report or both.

Aspect 37: The method of aspect 36, wherein the WUS indicates that the discontinuous reception active time period is scheduled to be empty, receiving the one or more channel state information reports is based at least in part on the WUS and the signal enabling periodic reporting of the channel information with the modified channel state information measurement configuration.

Aspect 38: The method of any of aspects 34 through 37, further comprising: identifying a channel state information measurement periodicity for the discontinuous reception active time period; and modifying the channel state information measurement periodicity based at least in part on a scaling factor for the discontinuous reception inactive time period, wherein receiving the one or more channel state information reports is in accordance with the modified channel state information measurement periodicity.

Aspect 39: The method of any of aspects 34 through 38, wherein the one or more channel state information reports corresponds to a first channel state information reference signal included in the subsequent discontinuous reception active time period.

Aspect 40: The method of any of aspects 34 through 39, wherein receiving the one or more channel state information reports is based at least in part on one or more of a radio resource control signal, a medium access control layer control element, an indication in the WUS, or any combination thereof.

Aspect 41: A UE for wireless communications, comprising one or more memories storing processor-executable code, and one or more processors coupled with the one or more memories and individually or collectively operable to execute the code to cause the UE to perform a method of any of aspects 1 through 13.

Aspect 42: A UE for wireless communications, comprising at least one means for performing a method of any of aspects 1 through 13.

Aspect 43: A non-transitory computer-readable medium storing code for wireless communications, the code comprising instructions executable by one or more processors to perform a method of any of aspects 1 through 13.

Aspect 44: A UE for wireless communications, comprising one or more memories storing processor-executable code, and one or more processors coupled with the one or more memories and individually or collectively operable to execute the code to cause the UE to perform a method of any of aspects 14 through 20.

Aspect 45: A UE for wireless communications, comprising at least one means for performing a method of any of aspects 14 through 20.

Aspect 46: A non-transitory computer-readable medium storing code for wireless communications, the code comprising instructions executable by one or more processors to perform a method of any of aspects 14 through 20.

Aspect 47: A network entity for wireless communications, comprising one or more memories storing processor-executable code, and one or more processors coupled with the one or more memories and individually or collectively operable to execute the code to cause the network entity to perform a method of any of aspects 21 through 33.

Aspect 48: A network entity for wireless communications, comprising at least one means for performing a method of any of aspects 21 through 33.

Aspect 49: A non-transitory computer-readable medium storing code for wireless communications, the code comprising instructions executable by one or more processors to perform a method of any of aspects 21 through 33.

Aspect 50: A network entity for wireless communications, comprising one or more memories storing processor-executable code, and one or more processors coupled with the one or more memories and individually or collectively operable to execute the code to cause the network entity to perform a method of any of aspects 34 through 40.

Aspect 51: A network entity for wireless communications, comprising at least one means for performing a method of any of aspects 34 through 40.

Aspect 52: A non-transitory computer-readable medium storing code for wireless communications, the code comprising instructions executable by one or more processors to perform a method of any of aspects 34 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive a configuration for communicating with a network entity, wherein the configuration indicates a connected-mode discontinuous reception cycle, wherein each cycle includes a discontinuous reception active time period and a discontinuous reception inactive time period;

receive control information that configures a wake up signal (WUS) window for reception of a WUS, wherein reception of the WUS is in accordance with timing that is based on a WUS reference signal;

receive the WUS or the WUS reference signal during the WUS window; and transmit an uplink control signal prior to or at a beginning of a subsequent discontinuous reception active time period based at least in part on reception of the WUS or of the WUS reference signal and on a determination of whether an offset period between a beginning of the WUS window and the beginning of the subsequent discontinuous reception active time period satisfies a threshold.

2. The UE of claim 1, wherein the one or more processors are individually or collectively further operable to execute the code to cause the UE to:

receive a signal enabling periodic reporting of channel information, wherein the channel information comprises a reference signal received power report or a channel state information report or both.

3. The UE of claim 2, wherein, to receive the WUS or the WUS reference signal, the one or more processors are individually or collectively further operable to execute the code to cause the UE to:

receive the WUS during the WUS window, the WUS indicating that the subsequent discontinuous reception active time period is scheduled to be empty, wherein transmitting the uplink control signal is based at least in part on the WUS and the signal enabling periodic reporting of the channel information.

4. The UE of claim 1, wherein the one or more processors are individually or collectively further operable to execute the code to cause the UE to:

monitor for the WUS reference signal comprising a demodulation reference signal for link quality measurement; and measure one or more channel parameters based at least in part on the demodulation reference signal.

5. The UE of claim 4, wherein transmitting the uplink control signal is based at least in part on the one or more channel parameters being greater than a second threshold.

6. The UE of claim 4, wherein transmitting the uplink control signal is based at least in part on a difference in two subsequent measurements of the one or more channel parameters satisfying a second threshold.

7. The UE of claim 1, wherein, to receive the WUS or the WUS reference signal, the one or more processors are individually or collectively further operable to execute the code to cause the UE to:

receive the WUS during the WUS window, the WUS indicating that a data transmission is scheduled for the subsequent discontinuous reception active time period.

8. The UE of claim 7, wherein the uplink control signal is transmitted to report channel information based at least in part on a WUS demodulation reference signal, which is used to select a modulation and coding scheme of the data transmission in the subsequent discontinuous reception active time period.

9. The UE of claim 1, wherein the one or more processors are individually or collectively further operable to execute the code to cause the UE to:

monitor for the WUS reference signal comprising a demodulation reference signal during the WUS window, wherein the WUS is not received in the WUS window.

10. The UE of claim 9, wherein the one or more processors are individually or collectively further operable to execute the code to cause the UE to:

measure a link quality based at least in part on the demodulation reference signal, wherein transmitting the uplink control signal is based at least in part on the link quality satisfying a second threshold.

11. The UE of claim 1, wherein the one or more processors are individually or collectively further operable to execute the code to cause the UE to:

receive a radio resource control signal configuring a physical uplink control channel for transmitting the uplink control signal prior to or at the beginning of the subsequent discontinuous reception active time period.

12. The UE of claim 1, wherein the one or more processors are individually or collectively further operable to execute the code to cause the UE to:

receive a radio resource control signal configuring a physical uplink control channel for transmitting the uplink control signal during the offset period, wherein the offset period is greater than the threshold.

13. The UE of claim 1, wherein transmitting the uplink control signal is based at least in part on one or more of a radio resource control signal, a medium access control layer control element, an indication in the WUS, or any combination thereof.

14. A user equipment (UE), comprising:

one or more memories storing processor-executable code; and one or more processors coupled with the one or more memories and individually or collectively operable to execute the code to cause the UE to:

receive a configuration for communicating with a network entity, wherein the configuration indicates a connected-mode discontinuous reception cycle, wherein each cycle includes a discontinuous reception active time period and a discontinuous reception inactive time period, and wherein the discontinuous reception active time period and the discontinuous reception inactive time period each comprises a quantity of channel state information reference signals;

receive control information that configures a wake up signal (WUS) window for reception of a WUS;

receive the WUS during the WUS window; and transmit, during a subsequent discontinuous reception active time period and based at least in part on reception of the WUS, one or more channel state information reports corresponding to a subset of the quantity of channel state information reference signals, wherein the subset of the quantity of channel state information reference signals is a first channel state information reference signal included in the subsequent discontinuous reception active time period.

15. The UE of claim 14, wherein the one or more processors are individually or collectively further operable to execute the code to cause the UE to:

receive a modified channel state information measurement configuration for the discontinuous reception inactive time period based at least in part on a UE assistance information.

16. The UE of claim 14, wherein the one or more processors are individually or collectively further operable to execute the code to cause the UE to:

receive a signal enabling periodic reporting of channel information, wherein the channel information comprises a reference signal received power report or a channel state information report or both.

17. The UE of claim 16, wherein:

the WUS indicates that the discontinuous reception active time period is scheduled to be empty, and wherein transmitting the one or more channel state information reports is based at least in part on the WUS and the signal enabling periodic reporting of the channel information with a modified channel state information measurement configuration.

18. The UE of claim 14, wherein the one or more processors are individually or collectively further operable to execute the code to cause the UE to:

identify a channel state information measurement periodicity for the discontinuous reception active time period; and modify the channel state information measurement periodicity based at least in part on a scaling factor for the discontinuous reception inactive time period, wherein transmitting the one or more channel state information reports is in accordance with the modified channel state information measurement periodicity.

19. The UE of claim 14, wherein transmitting the one or more channel state information reports is based at least in part on one or more of a radio resource control signal, a medium access control layer control element, an indication in the WUS, or any combination thereof.

20. A network entity, comprising:

one or more memories storing processor-executable code; and one or more processors coupled with the one or more memories and individually or collectively operable to execute the code to cause the network entity to:

transmit a configuration for communicating with a user equipment (UE), wherein the configuration indicates a connected-mode discontinuous reception cycle, wherein each cycle includes a discontinuous reception active time period and a discontinuous reception inactive time period;

transmit control information that configures a wake up signal (WUS) window for reception of a WUS, wherein reception of the WUS is in accordance with timing that is based on a WUS reference signal;

transmit the WUS or the WUS reference signal during the WUS window; and receive an uplink control signal prior to or at a beginning of a subsequent discontinuous reception active time period based at least in part on reception of the WUS or of the WUS reference signal and on a determination of whether an offset period between a beginning of the WUS window and the beginning of the subsequent discontinuous reception active time period satisfies a threshold.

21. The network entity of claim 20, wherein the one or more processors are individually or collectively further operable to execute the code to cause the network entity to:

transmit a signal enabling periodic reporting of channel information, wherein the channel information comprises a reference signal received power report or a channel state information report or both.

22. The network entity of claim 21, wherein, to transmit the WUS or the WUS reference signal, the one or more processors are individually or collectively further operable to execute the code to cause the network entity to:

transmit the WUS during the WUS window, the WUS indicating that the subsequent discontinuous reception active time period is scheduled to be empty, wherein receiving the uplink control signal is based at least in part on the WUS and the signal enabling periodic reporting of the channel information.

23. The network entity of claim 20, wherein the one or more processors are individually or collectively further operable to execute the code to cause the network entity to:

identify one or more channel parameters based at least in part on the WUS reference signal comprising a demodulation reference signal for link quality measurement.

24. The network entity of claim 23, wherein receiving the uplink control signal is based at least in part on the one or more channel parameters being greater than a second threshold.

25. The network entity of claim 23, wherein receiving the uplink control signal is based at least in part on a difference in two subsequent measurements of the one or more channel parameters satisfying a second threshold.

26. The network entity of claim 20, wherein, to transmit the WUS or the WUS reference signal, the one or more processors are individually or collectively further operable to execute the code to cause the network entity to:

transmit the WUS during the WUS window, the WUS indicating that a data transmission is scheduled for the subsequent discontinuous reception active time period.

27. A network entity, comprising:

one or more memories storing processor-executable code; and one or more processors coupled with the one or more memories and individually or collectively operable to execute the code to cause the network entity to:

transmit a configuration for communicating with a network entity, wherein the configuration indicates a connected-mode discontinuous reception cycle, wherein each cycle includes a discontinuous reception active time period and a discontinuous reception inactive time period, and wherein the discontinuous reception active time period and the discontinuous reception inactive time period each comprises a quantity of channel state information reference signals;

transmit control information that configures a wake up signal (WUS) window for reception of a WUS;

transmit the WUS during the WUS window; and receive, during a subsequent discontinuous reception active time period and based at least in part on reception of the WUS, one or more channel state information reports corresponding to a subset of the quantity of channel state information reference signals, wherein the subset of the quantity of channel state information reference signals is a first channel state information reference signal included in the subsequent discontinuous reception active time period.

28. The network entity of claim 27, wherein the one or more processors are individually or collectively further operable to execute the code to cause the network entity to:

transmit a modified channel state information measurement configuration for the discontinuous reception inactive time period based at least in part on a UE assistance information.

29. The network entity of claim 27, wherein the one or more processors are individually or collectively further operable to execute the code to cause the network entity to:

transmit a signal enabling periodic reporting of channel information, wherein the channel information comprises a reference signal received power report or a channel state information report or both.

* * * * *